United States Patent
Davidow et al.

(10) Patent No.: US 9,463,352 B2
(45) Date of Patent: *Oct. 11, 2016

(54) HEALTH AID KIT AND METHOD FOR TREATING PAIN

(71) Applicant: SHARE Solutions, LLC, Palm Beach, FL (US)

(72) Inventors: Robert Davidow, Palm Beach, FL (US); Stacey Bell, Bloomfield, NJ (US); Hiroko Davidow, Palm Beach, FL (US); Johnny Shealy, Greenacres, FL (US)

(73) Assignee: SHARE SOLUTIONS, LLC, Palm Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/617,580

(22) Filed: Feb. 9, 2015

(65) Prior Publication Data

US 2015/0151159 A1 Jun. 4, 2015

Related U.S. Application Data

(63) Continuation-in-part of application No. 13/441,462, filed on Apr. 6, 2012, now Pat. No. 8,961,374.

(60) Provisional application No. 61/473,416, filed on Apr. 8, 2011.

(51) Int. Cl.
*A63B 21/002* (2006.01)
*A63B 23/025* (2006.01)
(Continued)

(52) U.S. Cl.
CPC ....... *A63B 23/025* (2013.01); *A63B 21/00047* (2013.01); *A63B 21/00054* (2013.01);
(Continued)

(58) Field of Classification Search
CPC .............. A63B 3/00; A63B 21/00047; A63B 21/0005; A63B 21/00054; A63B 21/00178; A63B 21/00185; A63B 21/002; A63B 21/0023; A63B 21/065; A63B 21/068; A63B 21/08; A63B 21/15; A63B 21/159; A63B 21/16; A63B 21/1609; A63B 21/1618; A63B 21/1627; A63B 21/1636; A63B 21/1645; A63B 21/1654; A63B 21/1663; A63B 21/1672; A63B 21/1681; A63B 21/169; A63B 21/4003; A63B 21/4005; A63B 21/4023; A63B 21/4025; A63B 21/4039; A63B 2023/003; A63B 2023/006; A63B 23/02; A63B 23/0205; A63B 23/0211; A63B 23/0216; A63B 23/0222; A63B 23/0233; A63B 23/0238; A63B 23/025; A63B 26/003; A63B 69/0057; A63B 69/0059; A63B 2208/02; A63B 2208/0204; A63B 2208/0271; A63B 2208/0295; A63B 2210/50; A63B 2225/09; A63B 2225/093
USPC .......................................... 482/91, 142–144
See application file for complete search history.

(56) References Cited

U.S. PATENT DOCUMENTS

| 821,335 A | * | 5/1906 | Butler | F16M 11/16 |
| | | | | 248/168 |
| 1,304,394 A | | 5/1919 | Shyer | |

(Continued)

FOREIGN PATENT DOCUMENTS

WO    9741925    11/1997

*Primary Examiner* — Oren Ginsberg
*Assistant Examiner* — Gary D Urbiel Goldner
(74) *Attorney, Agent, or Firm* — Duane Morris LLP; J. Rodman Steele, Jr.; Karen C. Kline

(57) ABSTRACT

A health aid, a health aid kit, and a method for treating neck, shoulder and back pain including a first elongated member, a second elongated member, and an attachment connecting the first and second elongated members and configured for the first and second elongated members to move between an open position, wherein a bottom end of each of the first and second elongated members are separated by a first distance, and an engaged position, wherein the bottom ends are separated by a second distance that is less than the first distance. Wherein the health aid kit includes instructions for carrying out the methods for treating neck, shoulder and back pain.

20 Claims, 19 Drawing Sheets

(51) Int. Cl.
*G09B 19/00* (2006.01)
*A63B 21/00* (2006.01)
*A63B 23/02* (2006.01)
*A63B 23/00* (2006.01)

(52) U.S. Cl.
CPC ......... *A63B23/0238* (2013.01); *G09B 19/003* (2013.01); *A63B 2023/006* (2013.01); *A63B 2208/0295* (2013.01); *A63B 2225/09* (2013.01); *A63B 2225/093* (2013.01)

(56) References Cited

U.S. PATENT DOCUMENTS

| | | | | |
|---|---|---|---|---|
| 1,602,385 | A * | 10/1926 | Bakenhus | E05C 17/443 126/304 A |
| 2,356,260 | A * | 8/1944 | Maxwell | A63B 21/0004 482/109 |
| 2,414,275 | A * | 1/1947 | Schwinn | B62K 21/16 74/551.4 |
| 2,529,347 | A * | 11/1950 | Ross, Jr. | A63B 21/0004 482/126 |
| 2,543,729 | A | 2/1951 | Magida | |
| RE23,744 | E * | 11/1953 | Magida | A63B 21/0004 403/103 |
| 2,725,232 | A | 11/1955 | Magida | |
| 2,756,618 | A | 7/1956 | Reaser | |
| 2,768,668 | A | 10/1956 | Santosuosso | |
| 2,806,699 | A * | 9/1957 | Spooner | A63B 21/00043 235/1 C |
| 3,173,415 | A | 3/1965 | Rubin | |
| 3,235,997 | A | 2/1966 | Stoner | |
| 3,340,611 | A | 9/1967 | Lauck | |
| 3,495,331 | A * | 2/1970 | Graham | B23D 29/023 30/233 |
| 3,515,384 | A * | 6/1970 | Alexander | A63B 21/015 482/119 |
| 3,591,173 | A | 7/1971 | Cossman | |
| 3,679,203 | A | 7/1972 | Grana | |
| 3,836,030 | A | 9/1974 | Timmons | |
| 3,879,033 | A | 4/1975 | Martin | |
| 4,023,796 | A | 5/1977 | Kusmer | |
| 4,083,156 | A * | 4/1978 | Tye | E04G 21/26 248/354.5 |
| D264,737 | S | 6/1982 | Cooper | |
| 4,351,224 | A * | 9/1982 | Curtis | F41A 23/08 42/94 |
| 4,465,276 | A | 8/1984 | Cox | |
| 4,483,533 | A * | 11/1984 | Mangiapane | A63B 21/0455 482/122 |
| 4,720,096 | A * | 1/1988 | Rogers | A63B 21/0004 482/106 |
| 4,861,022 | A * | 8/1989 | Boatcallie | A63B 21/0004 482/126 |
| 4,880,203 | A | 11/1989 | Holcomb | |
| 5,121,624 | A | 6/1992 | Haughian | |
| 5,246,413 | A * | 9/1993 | Koblick | A63B 21/0004 482/121 |
| D341,401 | S * | 11/1993 | Reichman | D21/692 |
| 5,290,209 | A | 3/1994 | Wilkinson | |
| D356,137 | S | 3/1995 | Hull | |
| 5,399,138 | A * | 3/1995 | Jones | A63B 21/0004 482/122 |
| 5,403,256 | A | 4/1995 | Squires | |
| 5,403,269 | A | 4/1995 | Kennedy | |
| 5,496,245 | A | 3/1996 | Du Verney | |
| 5,518,485 | A | 5/1996 | Zislis | |
| 5,569,141 | A | 10/1996 | Chou | |
| 5,690,596 | A * | 11/1997 | Parker | A63B 21/0004 482/121 |
| D390,301 | S | 2/1998 | Peterson | |
| 5,720,701 | A * | 2/1998 | Truini | A63B 21/0004 482/122 |
| 5,776,042 | A | 7/1998 | Szabo | |
| 5,820,520 | A | 10/1998 | Sieber | |
| D406,302 | S * | 3/1999 | Simpson | D22/100 |
| 5,988,710 | A | 11/1999 | Kortschot | |
| 6,090,024 | A | 7/2000 | Tsou | |
| 6,139,476 | A * | 10/2000 | Gallant | A63B 21/0004 482/114 |
| 6,142,488 | A * | 11/2000 | Orr | B60S 9/04 280/6.153 |
| D470,165 | S * | 2/2003 | Peterson | D16/244 |
| 6,513,778 | B2 * | 2/2003 | Hefley | A62B 3/005 248/351 |
| 6,663,071 | B2 * | 12/2003 | Peterson | F16M 11/20 248/440.1 |
| 6,829,857 | B1 * | 12/2004 | Houtsma | F41A 23/10 248/532 |
| 7,137,655 | B2 | 11/2006 | Quarberg | |
| 7,426,800 | B2 | 9/2008 | Pierce | |
| D583,268 | S | 12/2008 | Chan | |
| D619,181 | S * | 7/2010 | Oller | D21/662 |
| 7,789,815 | B2 * | 9/2010 | An | A63B 21/0004 482/126 |
| D634,796 | S | 3/2011 | Batiste | |
| 7,959,123 | B1 * | 6/2011 | Kitscha | F16M 11/04 248/168 |
| 8,092,354 | B2 * | 1/2012 | Oller, Jr. | A63B 21/00047 482/131 |
| 2004/0235627 | A1 | 11/2004 | Evminov | |
| 2006/0089239 | A1 | 4/2006 | Davies, III | |
| 2007/0238590 | A1* | 10/2007 | Jin | A63B 21/0004 482/121 |
| 2009/0270914 | A1* | 10/2009 | Heikkila | A61H 1/0292 606/237 |
| 2010/0081551 | A1 | 4/2010 | Harley | |

* cited by examiner

HEALTH AID KIT AND METHOD FOR TREATING PAIN

CROSS-REFERENCE TO RELATED APPLICATIONS

This application is a continuation-in-part of U.S. patent application Ser. No. 13/441,462, filed Apr. 6, 2012, which claims priority to U.S. Provisional Patent Application No. 61/473,416, filed Apr. 8, 2011, the entireties of which are incorporated herein by reference.

FIELD OF THE INVENTION

The present invention relates generally to the field of health and, in particular, to a kit for treating pain including neck, shoulder and back pain.

BACKGROUND

The neck, shoulders and back contain muscles, bones, nerves, arteries, and veins, as well as many ligaments and other supporting structures. Many conditions can cause pain in these areas. Some are not so dangerous but very cumbersome such as simple strains or contusions.

The most common causes of shoulder, neck and/or back pain include an injury to the soft tissues, including the muscles, tendons, and ligaments within these structures; stress from overuse or misuse of the muscles; and/or habit-patterns in posture, which can cause an individual to tighten the muscles for an extended period of time. Injuries can occur from whiplash or other trauma to these areas, while stress and tension can be caused by overuse, misuse, and/or anxiety. Shoulder and neck pain can lead to a stiff neck or shoulder and loss of range of motion. Headaches and pain at the Tempero-Mandibular Joint (TMJ) may be other possible consequences.

Various methods and devices are known to be useful for treating neck, shoulder and back pain. Some treatments can be applied at home, such as rest, cold and heat therapy, and administration of pain medications, while other treatments may require professional assistance, such as immobilization, medical testing, and surgery or other hospitalization. While conventional methods and others of the prior art are useful in some instances, there are still numerous deficiencies and potential opportunities for new, improved and more effective health aid features and methods for treating pain.

SUMMARY OF THE INVENTION

One object of the health aid, health aid kit, and associated methods described herein is to a new, improved and effective way to treat neck, shoulder and back pain.

A health aid, a health aid kit, and a method for treating neck, shoulder and back pain are described. The health aid can include a first elongated member, a second elongated member, and an attachment connecting the first and second elongated members and configured for the first and second elongated members to move between an open position, wherein a bottom end of each of the first and second elongated members are separated by a first distance, and an engaged position, wherein the bottom ends are separated by a second distance. The second distance can be less than the first distance.

The health aid can also include a closed position wherein the bottom ends of the first and second elongated members substantially adjacent with the first elongated member generally parallel to the second elongated member.

The attachment can connect the first and second elongated members proximate a top end. The attachment can also include a pivotal attachment. The pivotal attachment can include a pin, screw, or hinge.

The attachment can also include a cap with a first elongated member receiving portion and a second elongated member receiving portion such that the first elongated member receiving portion can engage with the first elongated member proximate a top end and the second elongated member receiving portion can engage with the second elongated member proximate a top end. The first and second elongated member receiving portions can also extend from an inside of the cap. The outside of the cap can also include an angled resting face for engagement with a substantially vertical surface.

The cap can also include a housing and first and second pins. The first pin can extends laterally across a first half of an inside of the housing and the second pin can extend laterally across a second half of the inside of the housing. The first elongated member can include a first aperture proximate a top end for receiving the first pin and the second elongated member can include a second aperture proximate a top end for receiving the second pin.

The health aid can also include a first securing foot connected to the bottom end of the first elongated member and a second securing foot connected to the bottom end of the second elongated member. Each of the first and second securing feet can also include a securing face for engagement with a substantially horizontal surface when the resting face on the cap engages with a substantially vertical surface. The securing faces can also include a corresponding angle to the resting face on the cap.

The health aid can also include telescoping elements, with the first elongated member including at least two first telescoping elements and the second elongated member including at least two second telescoping elements. The health aid can also include cushioning pieces, with a first cushioning piece connected to a bottom portion of the first elongated member and a second cushioning piece connected to a bottom portion of the second elongated member.

The method of treating neck, shoulder and back pain can include providing a health aid with a first elongated member, a second elongated member, and an attachment connecting the first and second elongated members and configured for the first and second elongated members to move between an open position and an engaged position; arranging the health aid at an angle with respect to a substantially horizontal plane; roving the health aid from the open position to the engaged position; and engaging the first and second elongated members of the health aid against a user's neck and/or shoulder muscles.

Moving the health aid from the open position to the engaged position can also include arranging the health aid in the open position; inserting a user's head and neck between the first and second elongated members; and moving the first and second elongated members closer together wherein the first and second elongated members abut a user's neck and/or shoulder muscles.

Engaging a user's neck and/or shoulder muscles can also include engaging the first elongated member against a user's right neck and/or shoulder muscles and engaging the second elongated member against a user's left neck and/or shoulder muscles, and suspending the user's head in an inverted position. Engaging a user's neck and/or shoulder muscles can also include stretching the neck and/or shoulder muscles in a first direction and concurrently stretching the neck and/or shoulder muscles in a second direction substantially opposite the first direction.

Arranging the health aid at an angle can also include an arrangement wherein a top end of the health aid engages with a substantially vertical surface and a bottom end of each of the first and second elongated members engage with a substantially horizontal surface. Arranging the health aid can also include engaging the resting face of the health aid with the substantially vertical surface. The substantially vertical surface can include a wall. The substantially horizontal surface can include a floor.

Arranging the health aid can alternately include an arrangement wherein an upper portion of the first and second elongated members rests against a raised surface and a bottom end of each of the first and second elongated members engages with a substantially horizontal surface.

In some embodiments, the first and second elongated elements can be separated from one another and then engaged with a portion of the body as part of an exercise or treatment. For example, as described previously, the right and left neck/shoulder muscles can engage the first and second elongated members, respectively. In addition, the right and left hands can be used to engage the first and second elongated members, respectively. In some embodiments, the body can engage the first and second elongated members as part of an exercise, such as stretching, yoga, or other weight bearing exercises. In other embodiments, the body can engage the first and second elongated members as part of a therapeutic treatment.

A health aid kit is also provided. The health aid kit includes a health aid as described herein and instructions for carrying out the method and any variants thereof described herein. The instructions can be in the form of an instructional video (e.g., DVD), a streaming video on a website or mobile app, a poster showing the various positions, or any other approach for communicating the intended use of the health aid.

These and other features, objects and advantages of the present invention will become more apparent to one skilled in the art from the following description and claims when read in light of the accompanying drawings.

DETAILED DESCRIPTION

Figure 1:
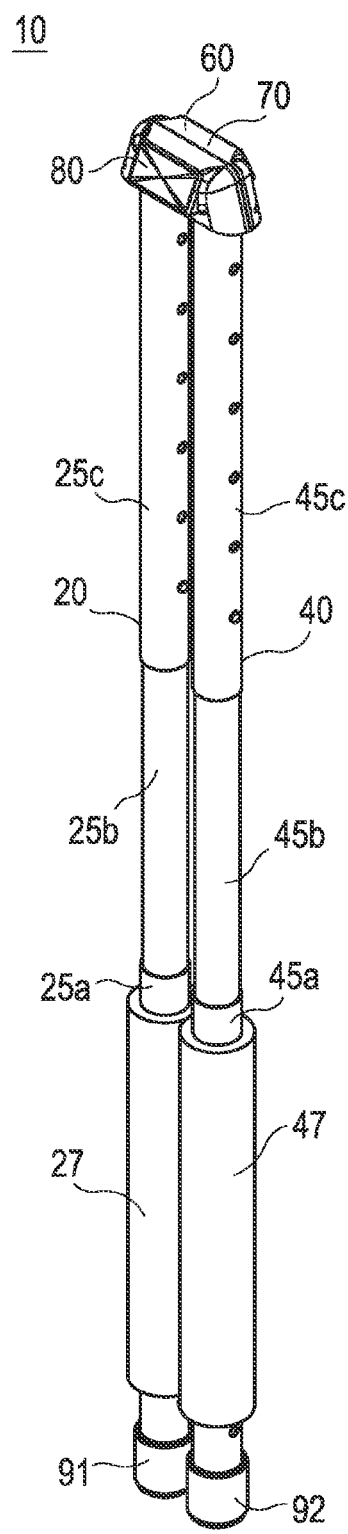
FIG. 1 is a perspective view of a health aid described herein in a closed position.

A health aid 10 for exercise and treating neck, shoulder and back pain is described herein. The apparatus and method may collectively be referred to herein as "the treatment." As used herein, "exercise" is intended to have its ordinary meaning and includes stretching, weight bearing exercise, and yoga. Examples of exercise include, but are not limited to, the positions shown in FIGS. 15A-15D.

The treatment is directed to engagement of the health aid apparatus 10 with a user's neck and/or shoulder muscles (T) in a practice that reduces, relieves, manages and/or eliminates the user's neck, shoulder and back pain, as well as, engagement of the health apparatus 10 to increase strength, flexibility, or both. As used herein, the phrase "neck and/or shoulder muscles" refers to the muscles located in the area at the juncture of the neck and shoulder, including the trapezius, and specifically the upper trapezius, and the levator scapulae muscles.

The terminology used herein is for the purpose of describing particular embodiments only and is not intended to be limiting of the invention. As used herein, the singular forms "a," "an" and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising."

As shown in FIGS. 1-17, the health aid 10 for treating neck, shoulder and back pain includes a first elongated member 20, a second elongated member 40, and an attachment 60 connecting the first and second elongated members 20, 40. The attachment 60 can be configured for the first and second elongated members 20, 40 to move between an open position as shown in FIG. 4A and an engaged position as shown in FIG. 4B.

FIGS. 15A-15D show a variety of positions that rely on engaging the user's body with the health aid 10 while performing a treatment, such as an exercise or posture. For example, the positions shown in cells A1 through A4 and E1 through E3 of FIGS. 15A-15D can be used for treating neck, shoulder and back pain, and in some cases increasing strength and flexibility. In addition, cells B1 through B3 and G2 of FIGS. 15A-15D show the user engaging the first and second elongated members 20, 40 with the user's hands in order to increase strength and/or flexibility, as well as, treat neck, shoulder and back pain. The remaining cells of FIGS. 15A-15D show the health aid 10 being used in either a different two stick position or a one stick position for developing strength and flexibility. Some of these positions also have the effect of treating neck, shoulder and back pain. As will be understood, building strength and flexibility is a method of treating neck, shoulder and back pain because it helps prevent musculoskeletal pain.

Figure 12A:
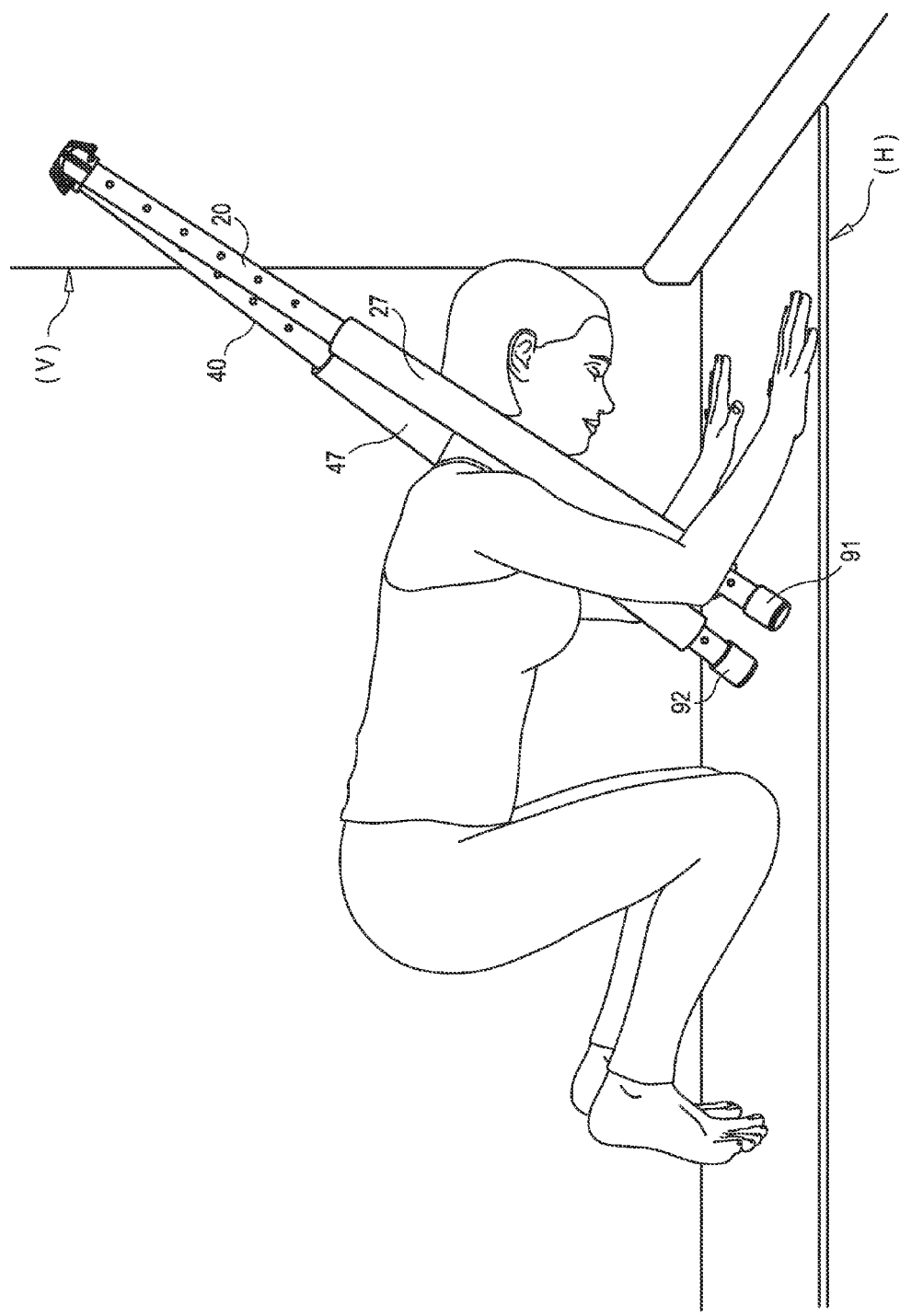
FIG. 12A is a perspective view of a user with a health aid described herein in an open position.

As used herein, the terms "top," "bottom," "upper" and "lower" refer to the vertical direction when the apparatus is resting on its feet as shown in FIG. 1. In the open position, a bottom end 21 of the first elongated member 20 and a bottom end 41 of the second elongated member 40 can be separated by a first distance (D1). The first distance (D1) can provide for a width between the lower portions of the elongated members 20, 40 such that a user's head can pass between the lower portions of the first and second elongated members 20, 40. For example, the first distance (D1) can include at least 5 inches, at least 6 inches, at least 8 inches, about 10-15 inches, less than 1.5 feet, or less than 2 feet. A user can be able to insert his head through the elongated members as shown in FIG. 12A.

In the engaged position, the bottom ends 21, 41 of the first and second elongated members 20, 40 can be separated by a second distance (D2) that is less than the first distance (D1), i.e. in the engaged position the first and second elongated 20, 40 are brought closer together than in the open position. The second distance (D2) can provide for a width between the lower portions of the elongated members 20, 40 that approximates the width of a users' neck. For example in the engaged position, one of the elongated members 20/40 can abut or otherwise be located near a right side of a user's neck and the other elongated member 40/20 can abut or otherwise be located near a left side of a user's neck. In another arrangement in the engaged position, one of the elongated members 20/40 can abut or otherwise be located near a right-side juncture of a user's neck and shoulder and the other elongated member 40/20 can abut or otherwise be located near a left-side juncture of a user's neck and shoulder.

Figure 2:
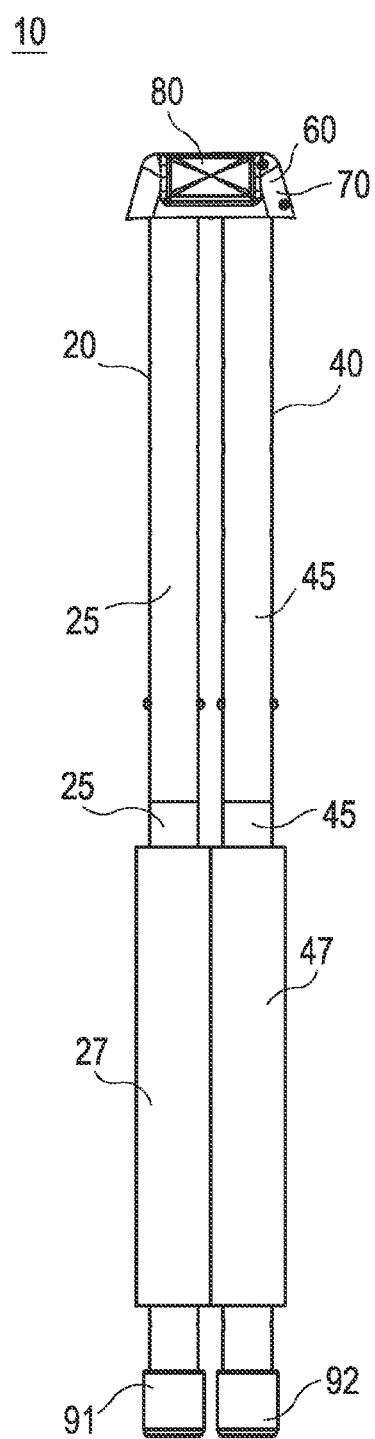
FIG. 2 is a front view of another health aid described herein in a closed position.

The health aid 10 can also include a closed position as shown in FIGS. 1 and 2. In the closed position, the bottom ends 21, 41 of the first and second elongated members 20, 40 can be substantially adjacent and the first elongated member 20 can be generally parallel to the second elongated member 40. The closed position can provide a configuration for easier storage and transport of the health aid 10 when not in use.

The first and second elongated members 20, 40 can include a circular or polygonal cross-section. Each of the first and second elongated members 20, 40 can include a single element forming the elongated member 20/40 or multiple elements. The multiple elements can also be removably attachable to form the elongated member 20/40. Each of the first and second elongated members 20, 40 can also be telescoped. The first elongated member 20 can include at least two first telescoping elements 25 and the second elongated member 40 can include at least two second telescoping elements 45. For example as shown in FIG. 2, each of the first and second elongated members 20, 40 can include two telescoping elements 25, 45. Or as shown in FIG. 1, each of the first and second elongated members 20, 40 can include three telescoping elements 25, 45. The removably attachable and/or telescoping elements can be connected with various fasteners, including without limitation, retractable buttons and holes, pins and holes, compression couplings, and other similar fasteners.

Figure 3:
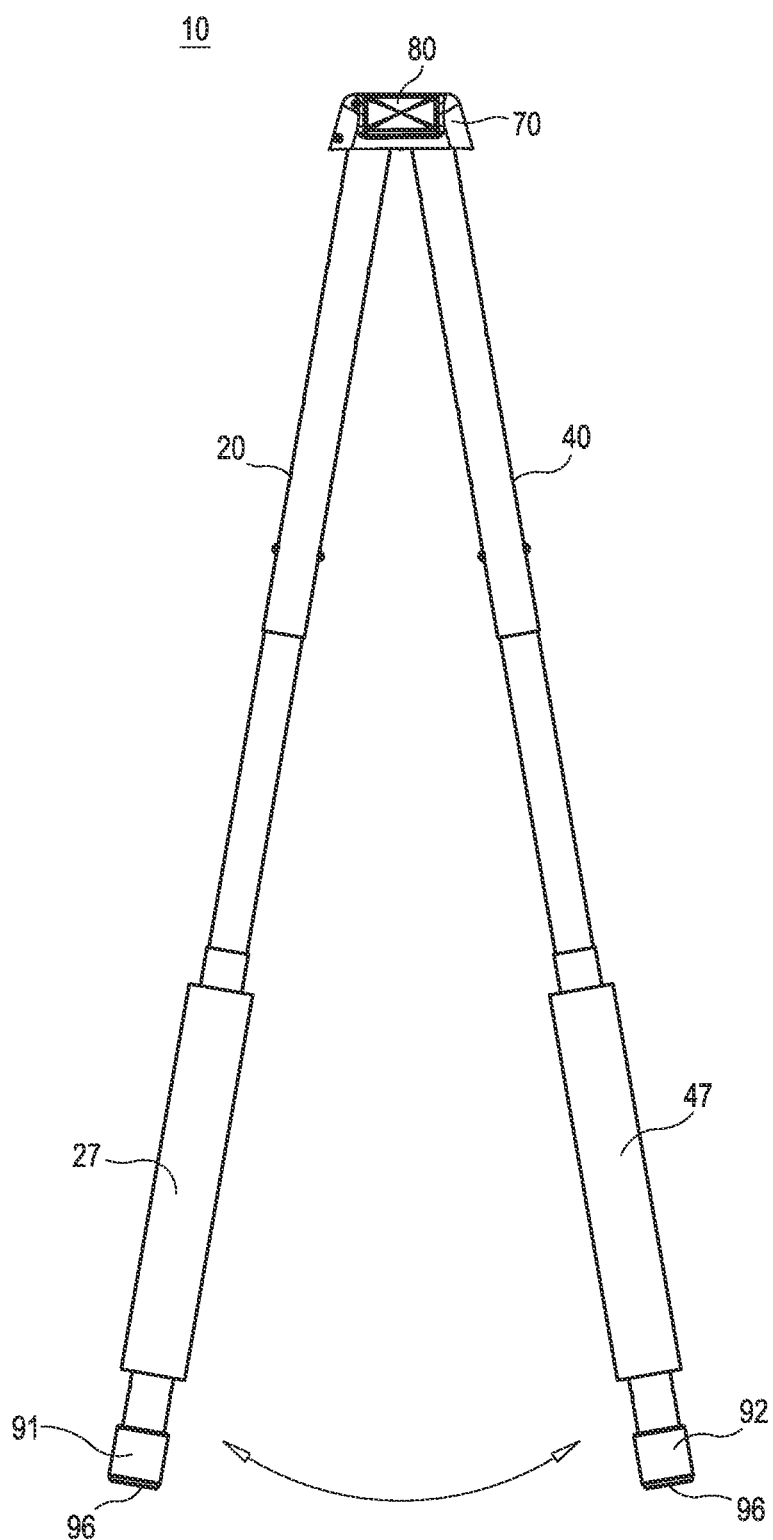
FIG. 3 is a front view of the health aid of FIG. 1.
Figure 4A:
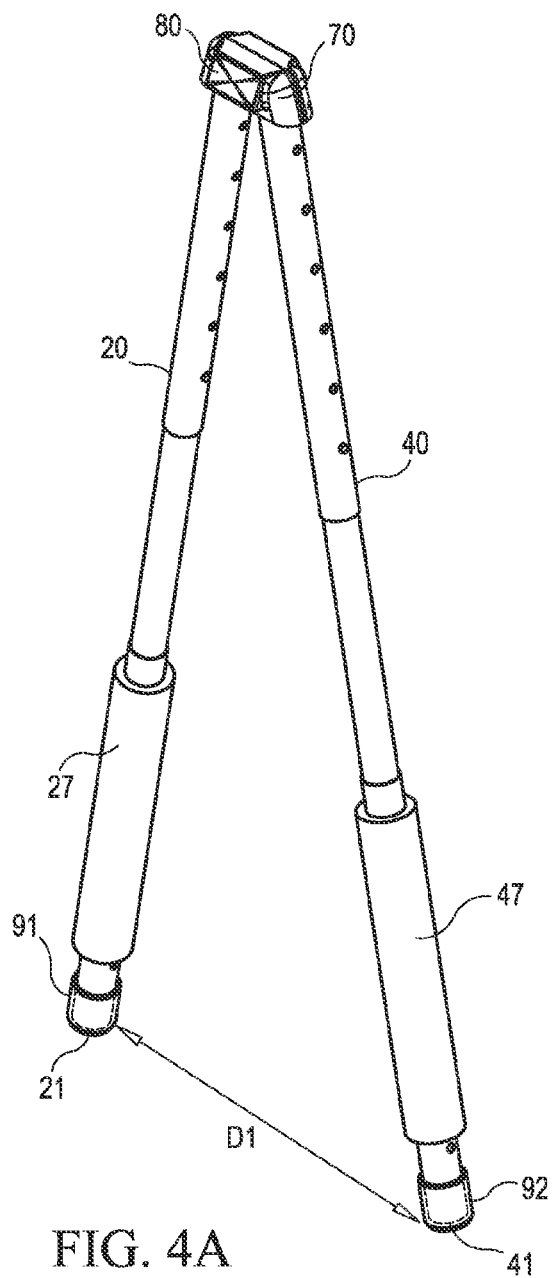
FIG. 4A is a perspective view of the health aid of FIG. 1 in an open position.
Figure 4B:
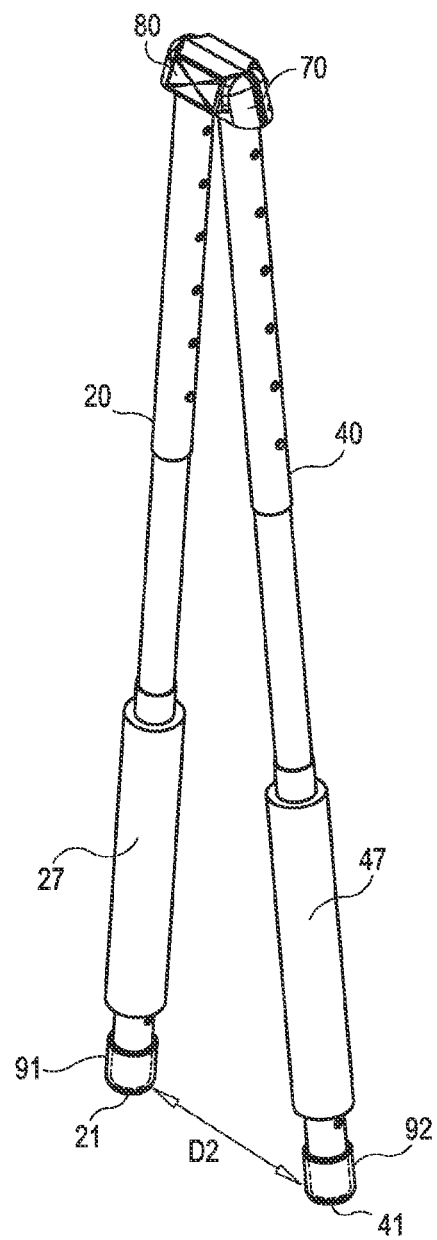
FIG. 4B is a perspective view of the health aid of FIG. 1 in an engaged position.
Figure 5:
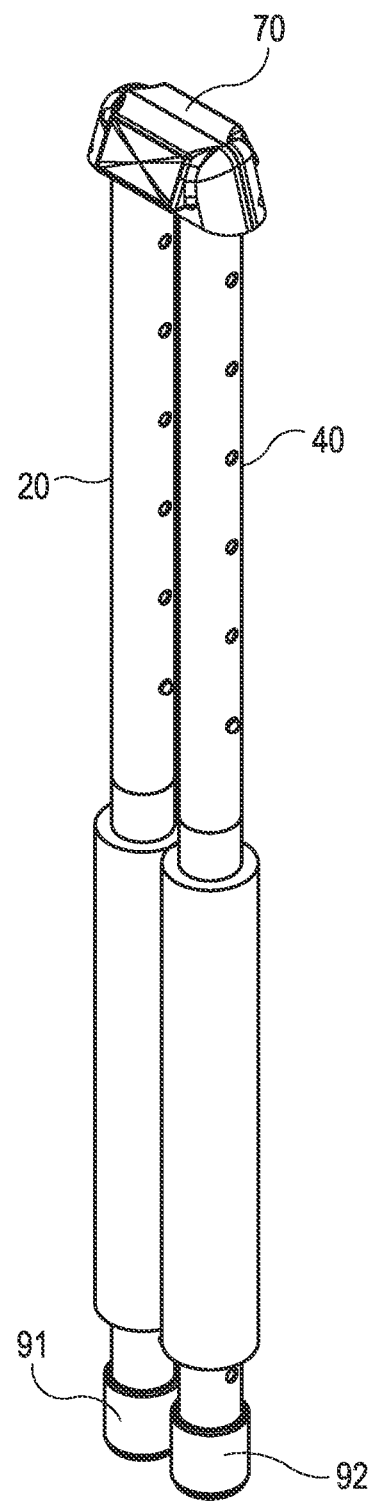
FIG. 5 is a perspective view of the health aid of FIG. 1 in a collapsed and closed position.

The telescoping elements 25, 45 can be in an expanded position as shown in FIGS. 1-4B when the health aid is in use. The telescoping elements 25, 45 can also be in various states of collapse. At least a portion of the telescoping elements 25, 45 can be partially or fully collapsed in order to selectively adjust the length of each elongated member 20, 40. The telescoping elements 25, 45 can also be in a collapsed position such that all of the telescoping elements 25, 45 can be fully collapsed. In particular, the elongated members 20, 40 can be arranged in a collapsed and closed position as shown in FIG. 5 for even easier storage and transport of the health aid 10.

The first and second elongated members 20, 40 can also include cushioning pieces 27, 47 in the areas where the elongated members 20, 40 are generally intended to engage with a user's neck and shoulders. As shown in FIGS. 1-5, 8 and 9, a first cushioning piece 27 can be connected to a bottom portion of the first elongated member 20 and a second cushioning piece 47 connected to a bottom portion of the second elongated member 40. The cushioning pieces 27, 47 can cover at least a portion of the bottom portions of the engagement members 20, 40. The cushioning pieces 27, 47 can also be moveable (e.g. slidable) along the respective elongated members 20, 40. The cushioning pieces 27, 47 can also be removable.

Figure 6:
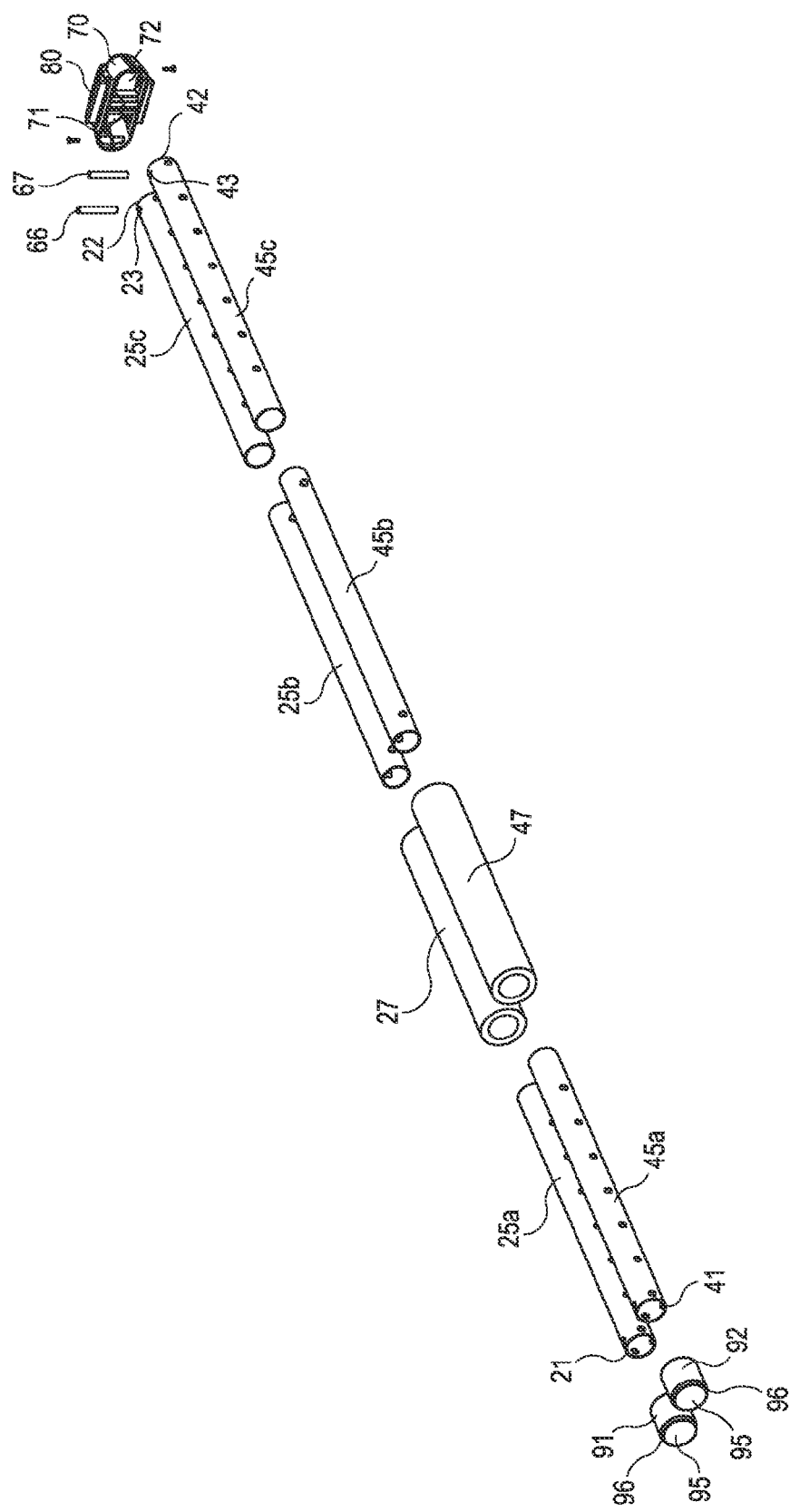
FIG. 6 is an exploded view of the health aid of FIG. 1.
Figure 8:
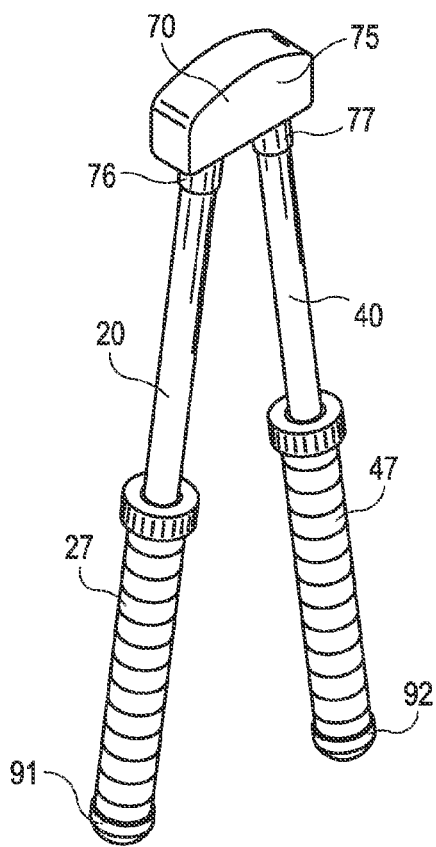
FIG. 8 is a perspective view of another health aid described herein.
Figure 9:
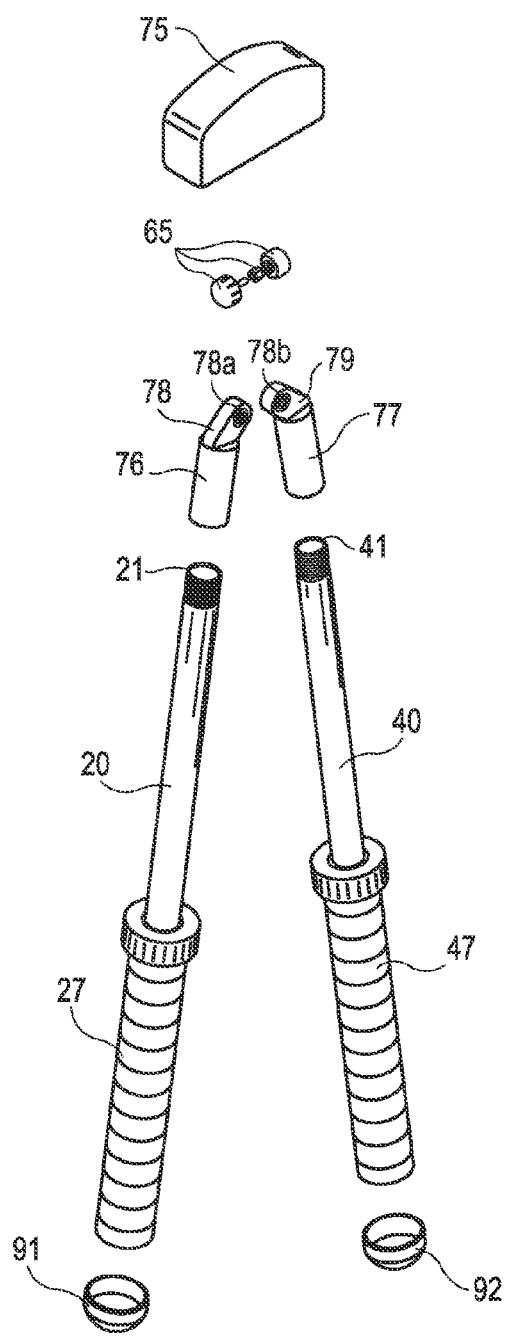
FIG. 9 is an exploded view of the health aid of FIG. 8.

The attachment 60 can connect the first and second elongated members 20, 40 at corresponding locations on each member 20, 40 including on a middle portion of each elongated member 20, 40 or on an upper portion of each elongated member 20, 40. In one arrangement as shown in FIGS. 1 and 6, the attachment 60 can connect the first and second elongated members 20, 40 proximate a top end 22, 42 of each of the elongated members 20, 40. The attachment 60 can also connect the first and second elongated members 20, 40 at the top end 22, 42 of each elongated member 20, 40 as shown in FIGS. 8 and 9.

The attachment 60 can be a pivotal attachment configured such that the elongated members 20, 40 can move as shown in FIG. 3 between at least the first position and second position. For example, the pivotal attachment 60 can include a hinge, a screw or similar fastener, or a pin. The attachment 60 can include one pivotal attachment for both of the elongated members 20, 40 or separate pivotal attachments for each of the elongated members 20, 40.

For example in one arrangement, the attachment 60 can include a fastener passing through each of the first and second elongated members 20, 40, directly connecting the first elongated member 20 to the second elongated member 40 and allowing each elongated member 20, 40 to pivot about the axis of the fastener 60.

As shown in FIGS. 1-9, the attachment 60 can also include a cap 70 for connecting to the first elongated member 20 and the second elongated member 40. The cap 70 can include a first elongated member receiving portion 71 and a second elongated member receiving portion 72. The first elongated member receiving portion 71 can engage with the first elongated member 20 proximate a top end 22 of the first elongated member 20. The second elongated member receiving portion 72 can engage with the second elongated member 40 proximate a top end 42 of the second elongated member 40. The first and second elongated member receiving portions 71, 72 can also extend from an inside of the cap 70.

In one arrangement as shown in FIGS. 8 and 9, the cap 70 can include a housing 75 and at least two swivels 76, 77 for receiving the elongated members 20, 40. The swivels 76, 77 can be pivotably attached to the housing 75 proximate a top end of each swivel 76, 77, and the bottom end of each swivel 76, 77 can receive a top end 21, 41 of an elongated member 20, 40. For example, the swivel 76, 77 and elongated member 20, 40 can engage via corresponding threading, pins and holes, retractable buttons and holes, and other similar fasteners. The top end of each swivel 76, 77 can also include a sloped portion 78, 79 with an orifice 78a, 79a. A fastener 65, including without limitation a bolt and nut, pin, or flanged fasteners, can connect the swivels 76, 77 to the housing 75 via the orifices 78a, 79a. One fastener 65 can be used to connect both orifices 78a, 79a to the housing 75 or separate fasteners can be used to connect each orifice 78a, 79a of each swivel 76, 77 to the housing 75.

Figure 7:
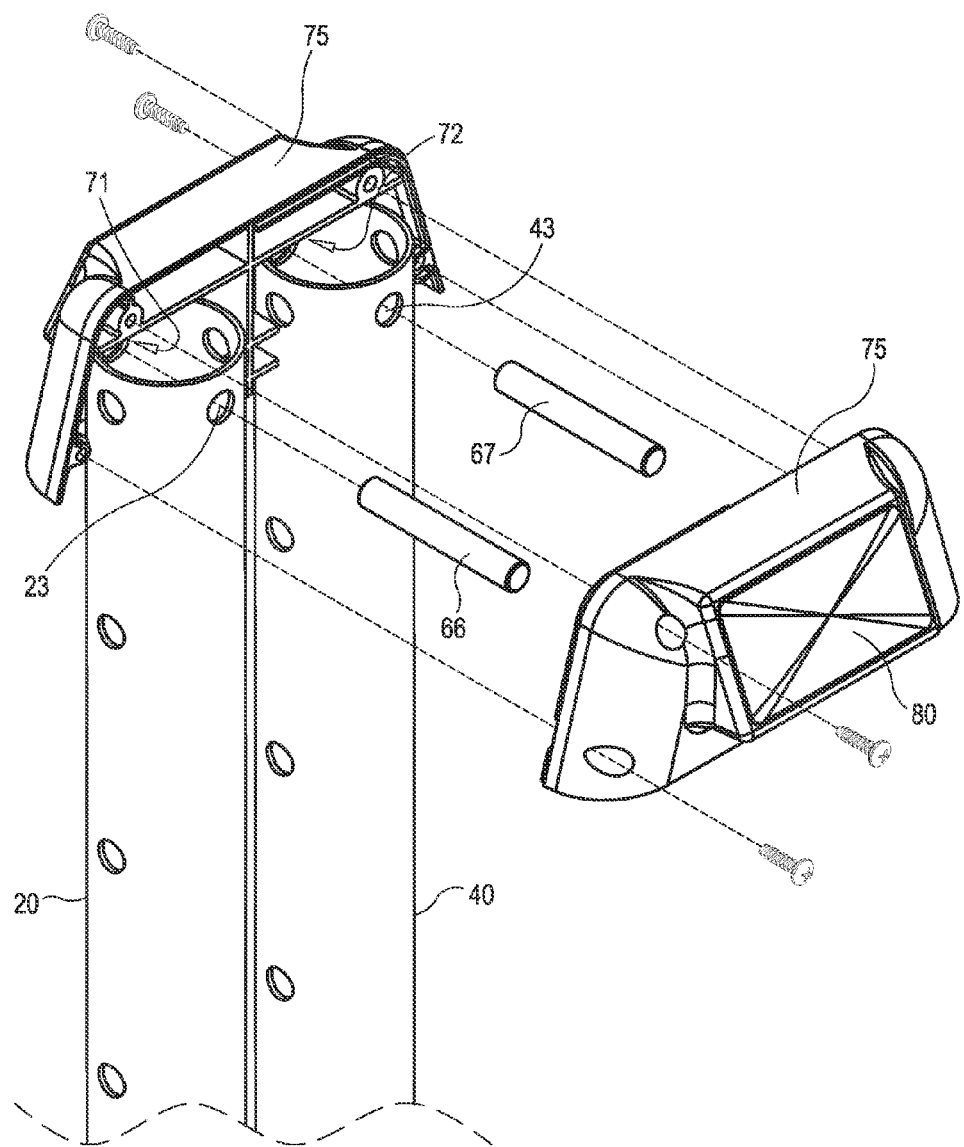
FIG. 7 is a partial exploded view of the top portion of the health aid of FIG. 1.

In another arrangement as shown in FIGS. 6 and 7, the cap 70 can include a housing 75 and pins 66, 67. The first elongated member 20 can include a first aperture 23 proximate the top end 22 of the first elongated member 20 and the second elongated member 40 can include a second aperture 43 proximate the top end 42 of the second elongated member 40. At least two pins 66, 67 can be arranged on an inside of the housing 75 and the first pin 66 can be received through at least a portion of the first aperture 23. The second pin 67 can be received through at least a portion of the second aperture 43. The first pin 66 can also extend laterally across a first half of the inside of the housing 75 and the second pin 67 can extend laterally across the second half as shown in FIG. 7.

The cap 70 can also include at least one resting face 80 for engagement with a substantially vertical surface (V). The resting face 80 can extend from or along an outside of the cap 70. The resting face 80 can be included on a first longitudinal side of the cap 70. Another resting face 80 can also be included on the second longitudinal side of the cap 70, i.e. a resting face 80 can be included on each side of the cap 70. The resting face 80 can house a frictional surface (e.g., rubber or plastic), which can be used for information/advertising and can also improve the traction against a vertical surface.

Figure 10:
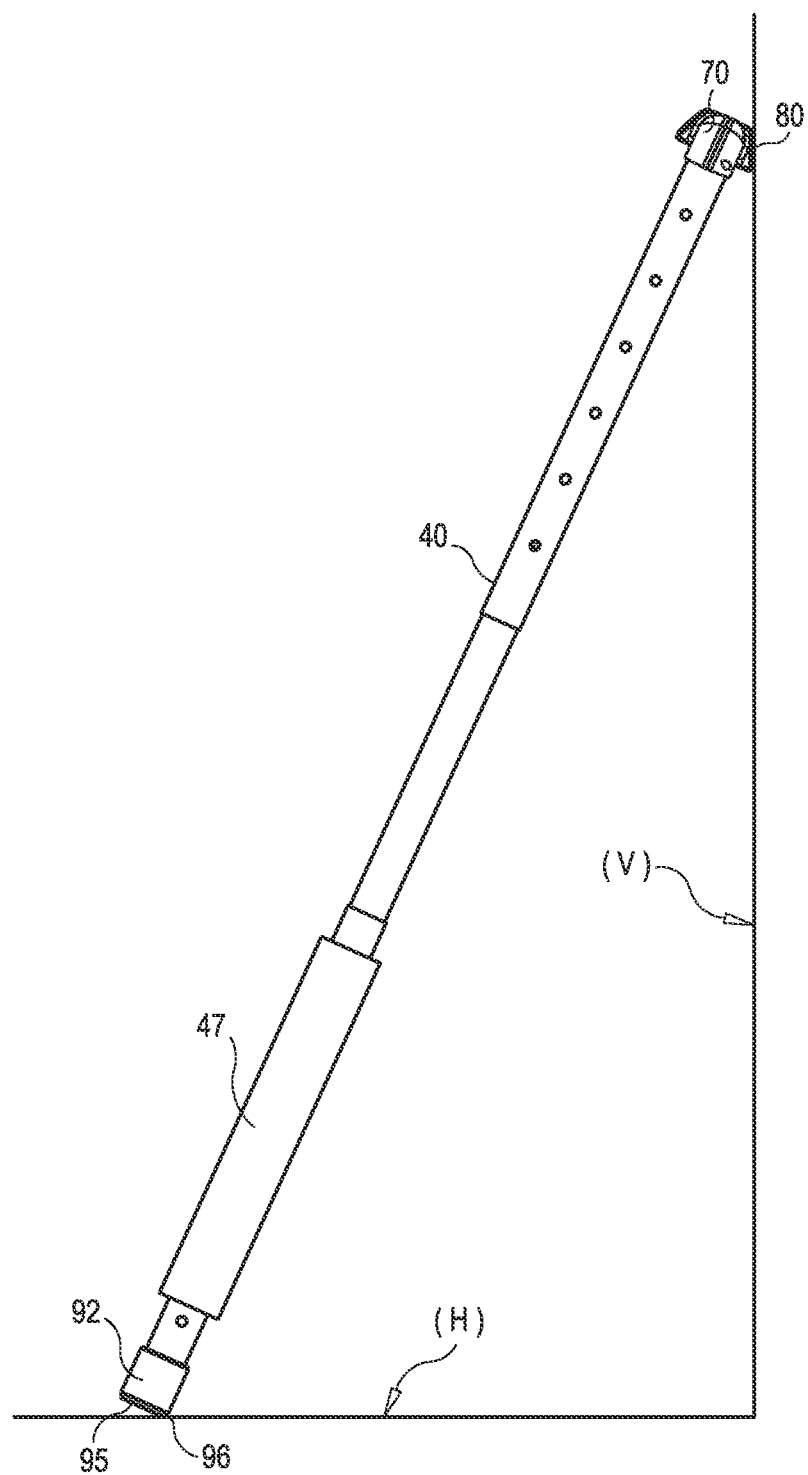
FIG. 10 is a side view of the health aid of FIG. 1 arranged at an angle.

As shown in FIGS. 1 and 7, the resting face 80 can also be angled with respect to a vertical axis of the health aid 10. The angled resting face 80 can be configured such that when the health aid 10 is arranged at a certain angle between a vertical surface (V) and horizontal surface (H), the resting face 80 of the cap 70 can rest against the vertical surface (V) as shown in FIG. 10. The resting face 80 can also include non-marking materials to reduce or prevent marks on a surface due to contact with the health aid 10. The resting face 80 can also include padding. In one embodiment, the resting face can include a bubble label.

The health aid 10 can also include securing feet 91, 92 for further stabilizing the health aid 10 when in use. A first securing foot 91 can be connected to the bottom end 21 of the first elongated member 20 and a second securing foot 92 can be connected to the bottom end 41 of the second elongated member 40, as shown in FIG. 6. The securing feet 91, 92 can provide additional stability such as by friction when the bottoms of the elongated members 20, 40 engage with a surface. For example, the frictional coefficient for the securing feet 91, 92 on a surface can be greater than for the ends 21, 41 of the elongated members 20, 40 alone on the same surface. The securing feet 91, 92 can include materials such as rubber, plastic, microfibers, polymers, and similar non-slipping materials. The securing feet 91, 92 can also include non-marking materials to reduce or prevent marks on a surface due to contact with the health aid 10.

Each securing foot 91, 92 can include a bottom wall 95. The bottom wall 95 can be curved as shown in FIGS. 8 and 9 or include angled faces as shown in FIGS. 1-3. At least a portion of the bottom wall 95 can include a securing face 96 for engagement with a substantially horizontal surface (H) when the health aid 10 is arranged at a certain angle with the horizontal surface (H), such as in FIG. 10.

The securing face 96 can also include a corresponding angle to the resting face 80 on the cap 70. As used herein, the term "corresponding angles" refers to a configuration such that an angle of the securing face 96 that engages with the substantially horizontal surface (H) corresponds to an angle of the cap's resting face 80 that engages with the substantially vertical surface (V). For example, when the health aid 10 is arranged at a certain angle between a substantially vertical surface (V) and a substantially horizontal surface (H), the securing face 96 of the feet 91, 92 can engage with the horizontal surface (H) when the resting face 80 on the cap 70 engages with the substantially vertical surface (V) as shown in FIG. 10.

A method for treating neck, shoulder and back pain using the above-described health aid 10 is also described herein. The method can include providing a health aid 10, arranging the health aid 10 at an angle with respect to a substantially horizontal plane and, once arranged, moving the health aid 10 from the open position to the engaged position, and engaging the first and second elongated members 20, 40 of the health aid 10 against a user's neck and/or shoulder muscles (T).

The step of arranging the health aid 10 at an angle can include an arrangement with the bottom end of each of the first and second elongated members 20, 40 (including securing feet 91, 92 if the securing feet are attached to the bottom ends) engaging with a substantially horizontal surface (H). In order to form the angle, a middle or upper portion of the health aid 10 can rest on a vertical or raised surface (V)/(R). The bottom ends of the elongated members 20, 40 can be arranged spaced apart from the vertical or raised surface (V)/(R). For example, the bottom ends can be at least 1 foot, about 1.5 feet, about 2-2.5 feet, about 3 feet, about 3.5 feet, or greater from the vertical or raised surface (V)/(R).

In one arrangement as shown in FIG. 10, a top end of the health aid 10 can engage with a substantially vertical surface (V). For example, the resting face 80 on the cap 70 can engage with the substantially vertical surface (V). A vertical surface (V) can be provided on any suitable structure or object including, without limitation, a wall or a door.

Figure 11:
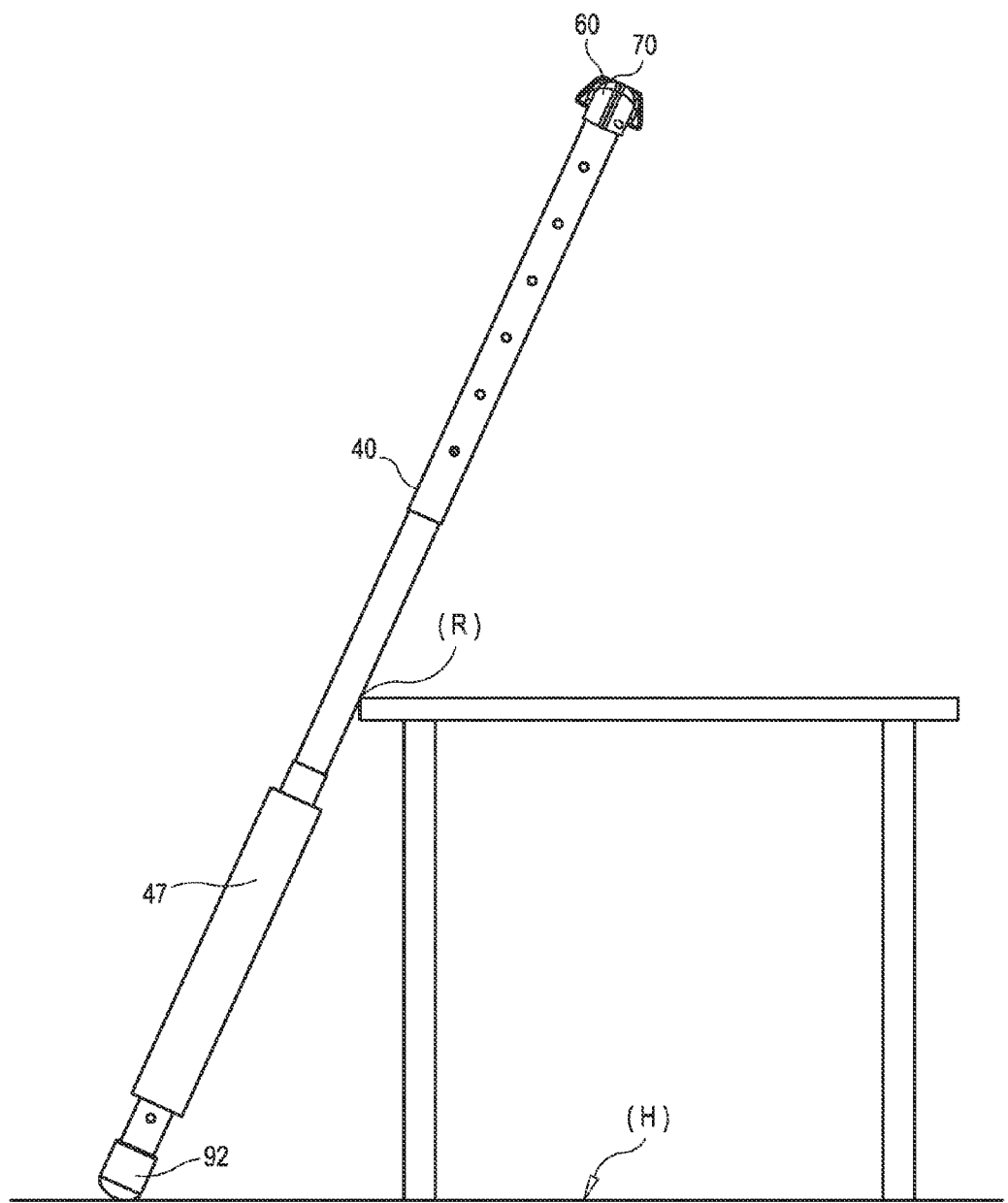
FIG. 11 is a side view of another health aid described herein arranged at an angle.

In another arrangement as shown in FIG. 11, an upper portion of the first and second elongated members 20, 40 can rest against a raised surface (R) to form an angle. As used herein, the term "raised surface" refers to a surface that is higher than the horizontal surface (H) such that the health aid 10 can form an angle with respect to the horizontal surface (H) when resting against the raised surface (R). A raised surface (R) can be provided on any suitable object or structure including, without limitation, a table, desk, chair, cabinet, or shelf.

Figure 12B:
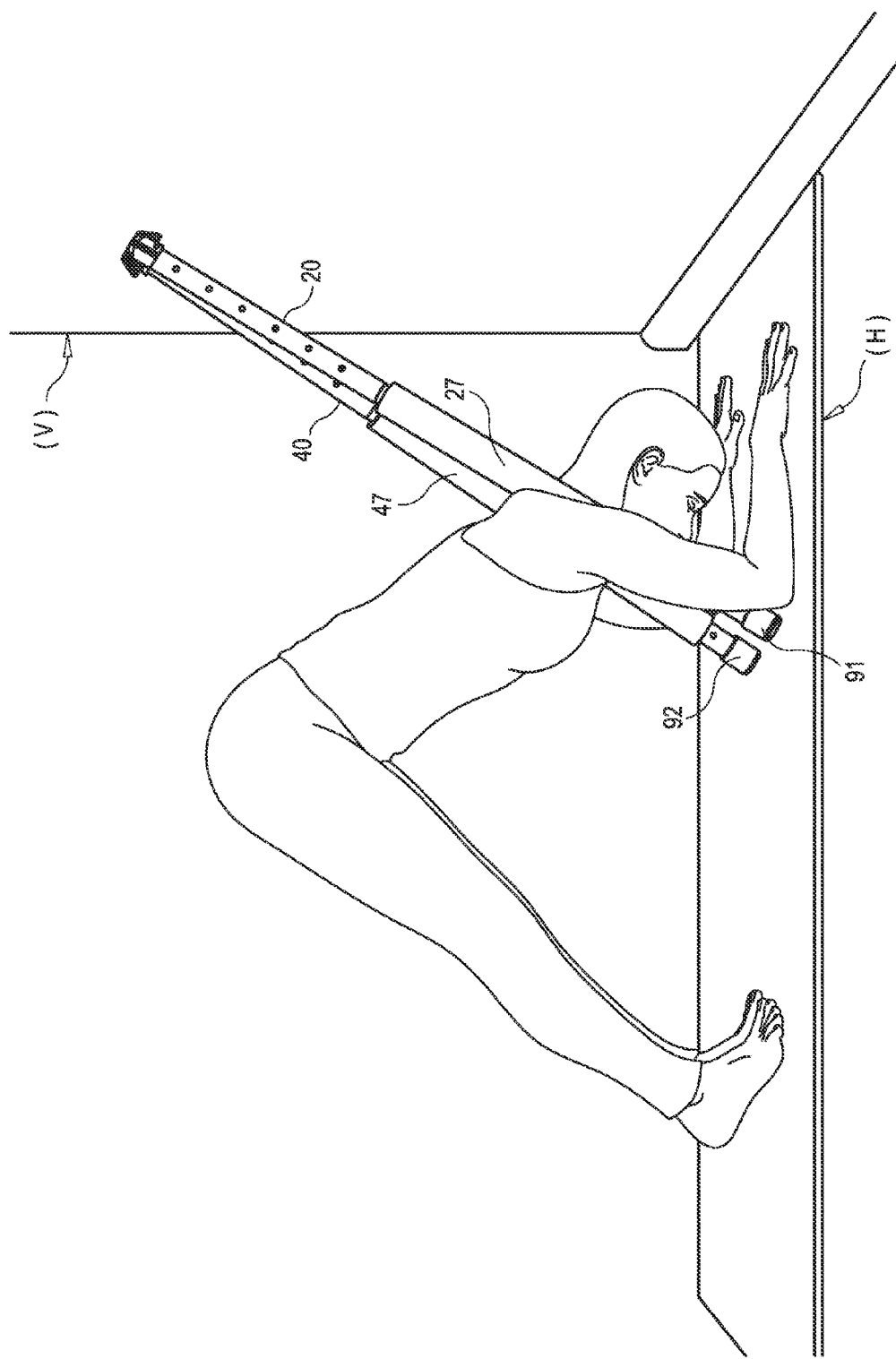
FIG. 12B is a perspective view of a user in a position with the health aid of FIG. 12A in an engaged position.
Figure 13:
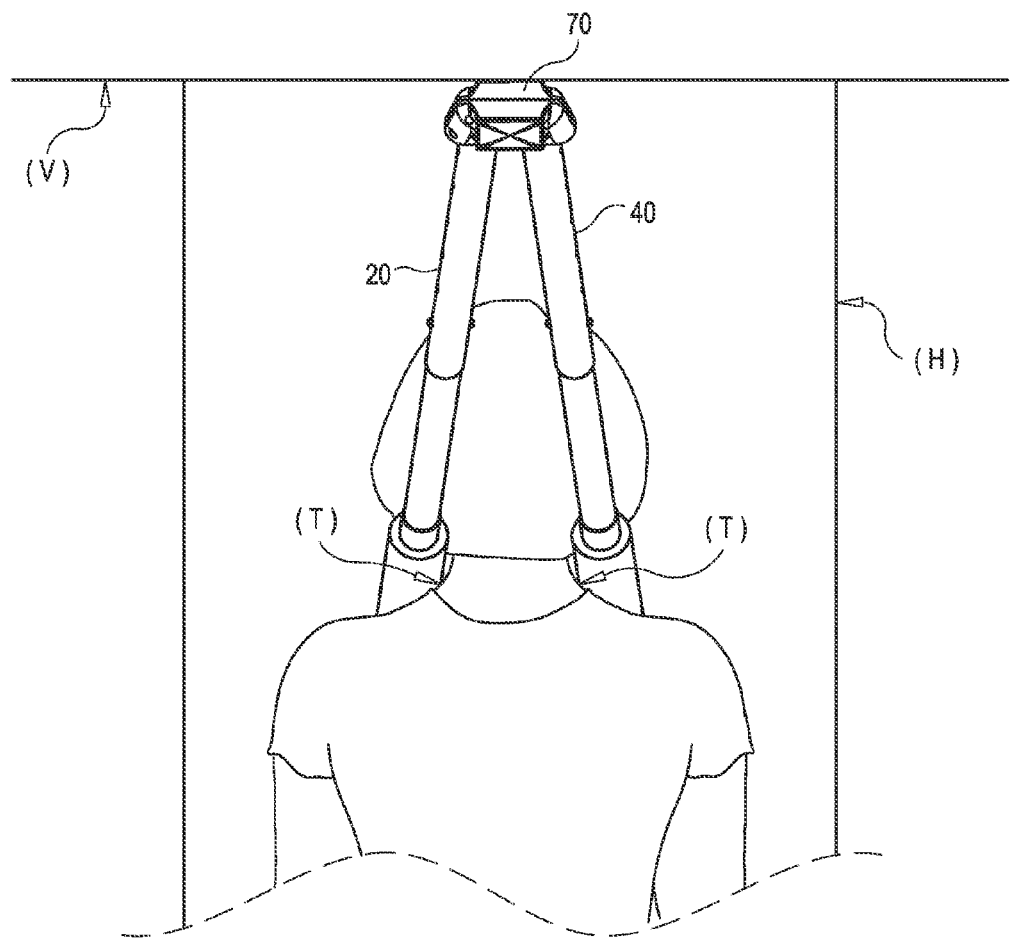
FIG. 13 is a partial top view of a user with the health aid of FIG. 12A in an engaged position.

The step of moving the health aid 10 from the open position to the engaged position can also include arranging the health aid 10 in the open position and inserting a user's head and neck between the first and second elongated members 20, 40 as shown in FIG. 12A, then moving the first and second elongated members 20, 40 closer together in the engaged position such that the first and second elongated members 20, 40 abut the user's neck and/or shoulder muscles (T) as shown in FIGS. 12B and 13.

The step of engaging a user's neck and/or shoulder muscles (T) can also include applying pressure to the neck and/or shoulder muscles (T) and/or stretching the neck and/or shoulder muscles (T) with the health aid 10. A user can also engage the health aid 10 to stretch his neck and/or shoulder muscles (T) in a first direction. For example, the first and second elongated members 20, 40 can stretch the neck and/or shoulder muscles (T) down the back towards the pelvis, e.g. by lifting the muscles in an upward or upwardly angled direction.

A user can also concurrently stretch his neck and/or shoulder muscles (T) in a second direction that is substantially opposite to the first direction. For example, engaging the user's neck and/or shoulder muscles (T) can include resting the first and second elongated members 20, 40 against the neck and/or shoulder muscles (T) and forming an inverted position such that the user's head is suspended as shown in FIGS. 12B and 120. In the suspended position, the user's head is released downward and gravity acts to gently traction the neck to concurrently stretch the neck and/or shoulder muscles (T) in a downward or downwardly angled direction.

As used herein, the terms "suspended" and "suspending" refer to suspending a user's head above a surface such as a floor, e.g. the user's head does not rest on the surface. A user's head can be in a suspended position while other body parts, such as his feet or hands, can be in contact with the surface. Resting the first and second elongated members 20, 40 against a user's neck and/or shoulder muscles (T) can also include resting the first elongated member 20 against the right neck and/or shoulder muscles (T) and resting the second elongated member 40 against the left neck and/or shoulder muscles (T).

Figure 12C:
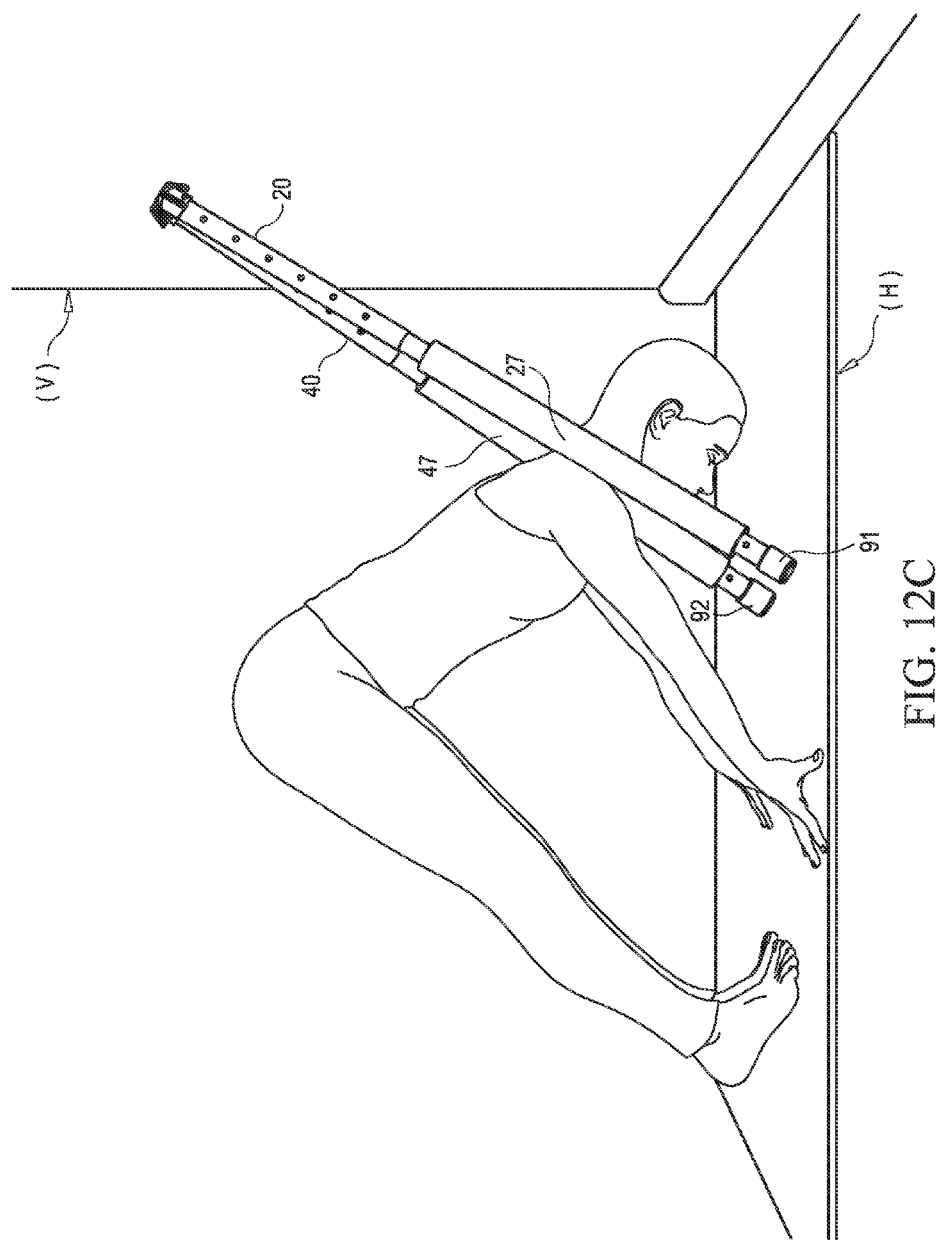
FIG. 12C is a perspective view of a user in another position with the health aid of FIG. 12A in an engaged position.

In an exemplary application, a user can kneel down in front of the arranged health aid 10 and place his head between the elongated members 20, 40. The elongated members 20, 40 can then be moved closer together (i.e. toward his neck) into the engaged position, so that the elongated members 20, 40 touch the neck and/or shoulder muscles (T). The user's forearms can be positioned around the outside of the elongated members 20, 40. The user can then lift his hips and lower his head to form an inverted position such that one or both of his feet are on the floor while his head is inverted. The forearms can rest on the floor if needed as shown in FIG. 12B (or cell A1 of FIG. 15A), or be raised to hover just above the floor as shown in FIG. 12C, and preferably be raised throughout the practice of achieving and maintaining the inverted position. As shown in cell A2 of FIG. 15A, in some instances, the user can raise one leg when in any of the inverted positions described above. In these positions, the user applies pressure to his neck and/or shoulder muscles (T) with the health aid 10 using gravity and his own weight. From these positions the user can raise their legs vertically to go into a headstand or forearm headstand, as shown in cells E1 and E2 of FIG. 15B, respectively. Similarly, the user can push up or into a handstand, which is shown in cell E3 of FIG. 15D, from a position such as that shown in FIG. 12A.

Additional treatments that can be practiced using the health aid 10 are shown in FIGS. 15A-15D. For example, as shown in FIG. 10, a top end of the health aid 10 can engage with a substantially vertical surface (V). For example, the resting face 80 on the cap 70 can engage with the substantially vertical surface (V). the health aid 10. The elongated members 20, 40 can be separated from one another into an open position or an engaged position. The user can stand facing the health aid 10 and lean forward to engage the first elongated member 20 and the second elongated member 40 with the hand on the corresponding side of the user. For example, when the health aid 10 is in the position shown in FIG. 12A, the user's right hand can engage the cushioning piece 27 on the first elongated member 20 and the user's left hand can engage the cushioning piece 47 on the second elongated member 40. Such a position is shown in cell B1 of FIG. 15A. The user can then, optionally, sequentially bend and straighten their elbows in order to perform a push-up-type motion. This treatment increases strength and flexibility, which can treat and prevent neck, shoulder, and back pain.

Using a similar angled set-up, a number of treatments can also be performed with the user facing away from the health aid 10. For example, starting with the elongated members 20, 40 separated from one another in an open position or an engaged position, the user can face away from the health aid 10 and reach back toward the first and second elongated members 20, 40, for example, the cushioning pieces 27, 47, with their hands. For example, when the health aid 10 is in the position shown in FIG. 12A, the user's left hand can engage the cushioning piece 27 on the first elongated member 20 and the user's right hand can engage the cushioning piece 47 on the second elongated member 40. As shown in cells B2 and B3 of FIGS. 15A & 15C, the user can bend their knees and then sequentially bend and straighten their elbows to perform a triceps press. As will be understood, the phrase "triceps press" may be all that is necessary for the instructions to communicate to the user that the user should assume the position shown and sequentially bend and straighten their elbows. In some embodiments, as shown in cell B3 of FIG. 15C, the user can extend one leg horizontally forward while performing the triceps press. This treatment increases strength and flexibility, which can treat and prevent neck, shoulder, and back pain.

Figure 15A:
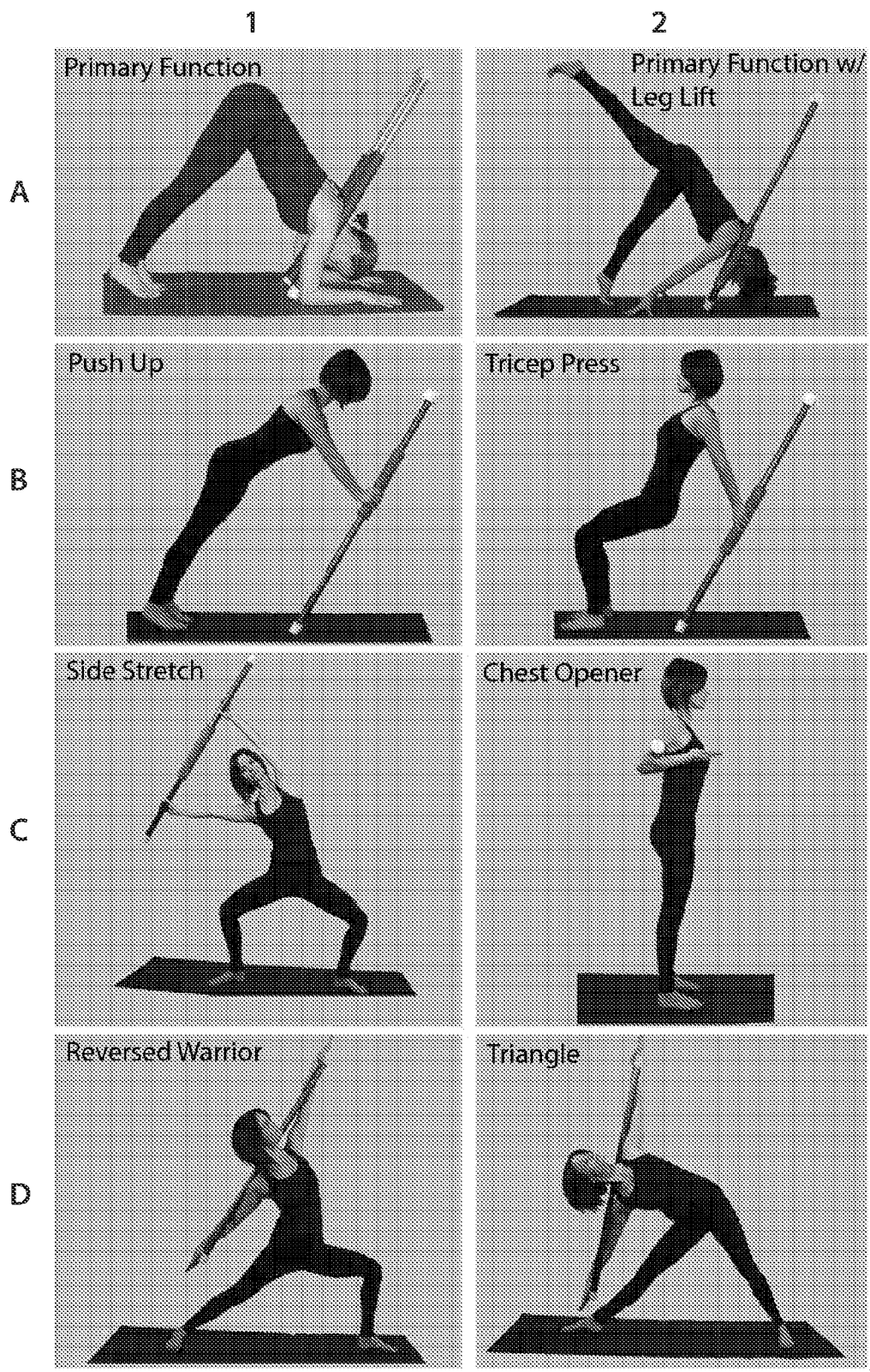
FIGS. 15A, 15B, 15C and 15D are diagrams showing a user engaging in a variety of positions of a user engaging in a variety of exercises using the health aid as described herein.
Figure 15B:
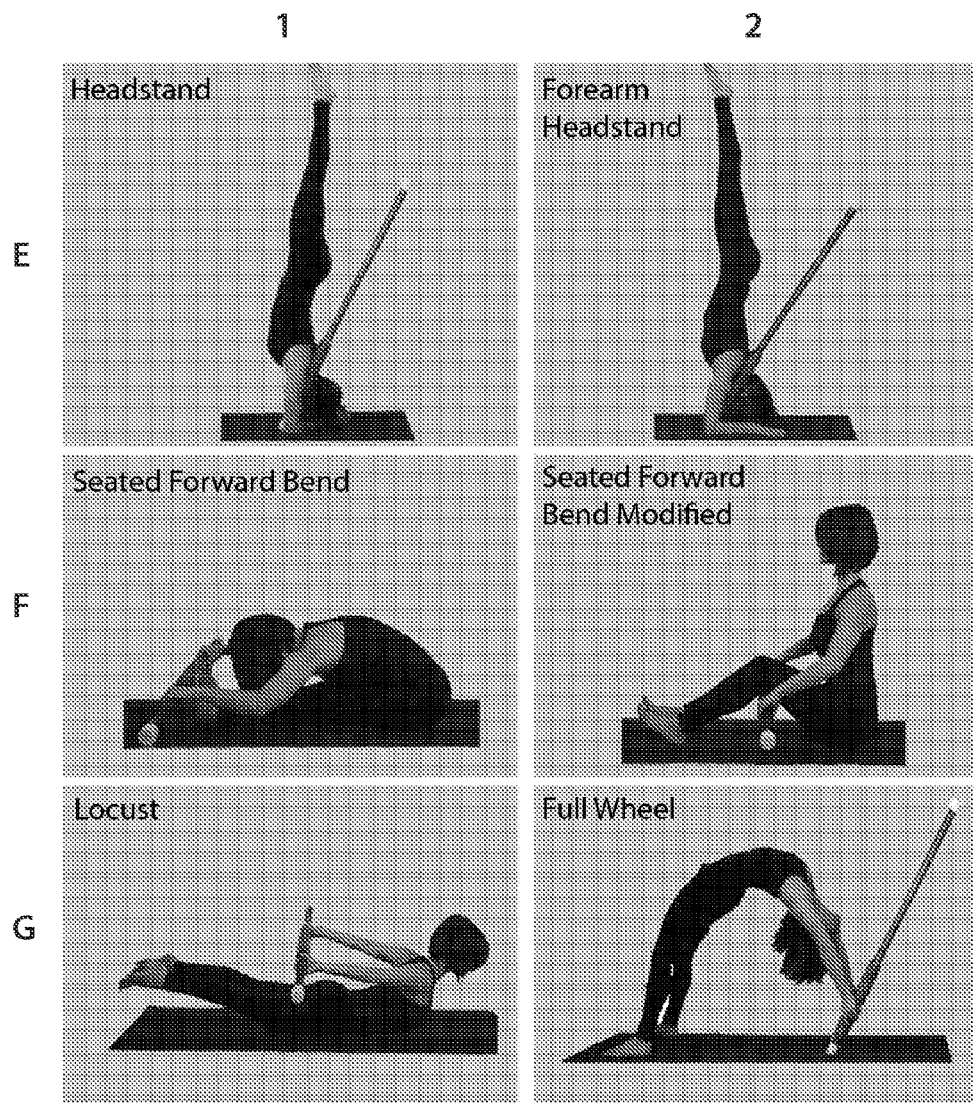
Figure 15C:
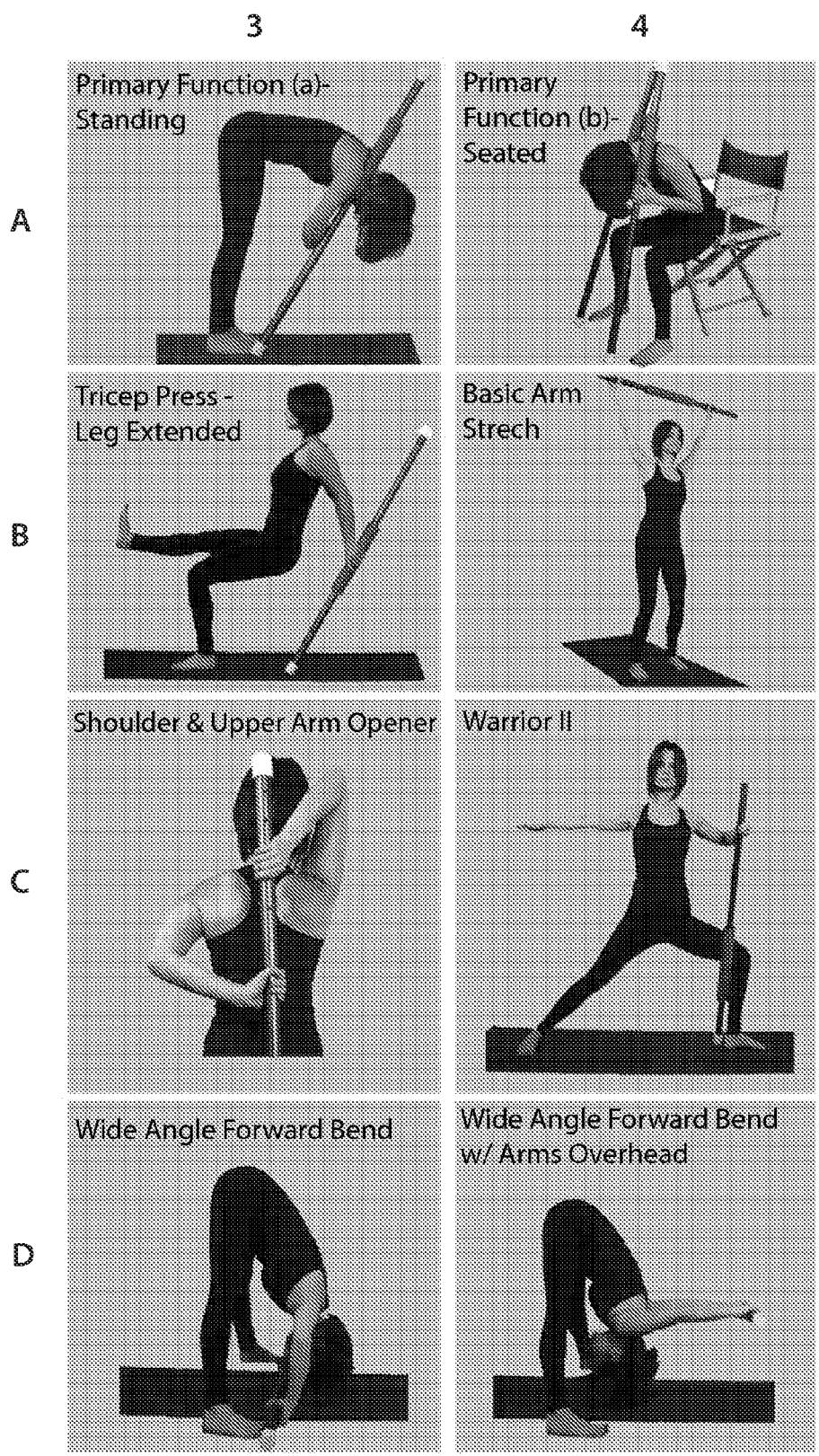
Figure 15D:
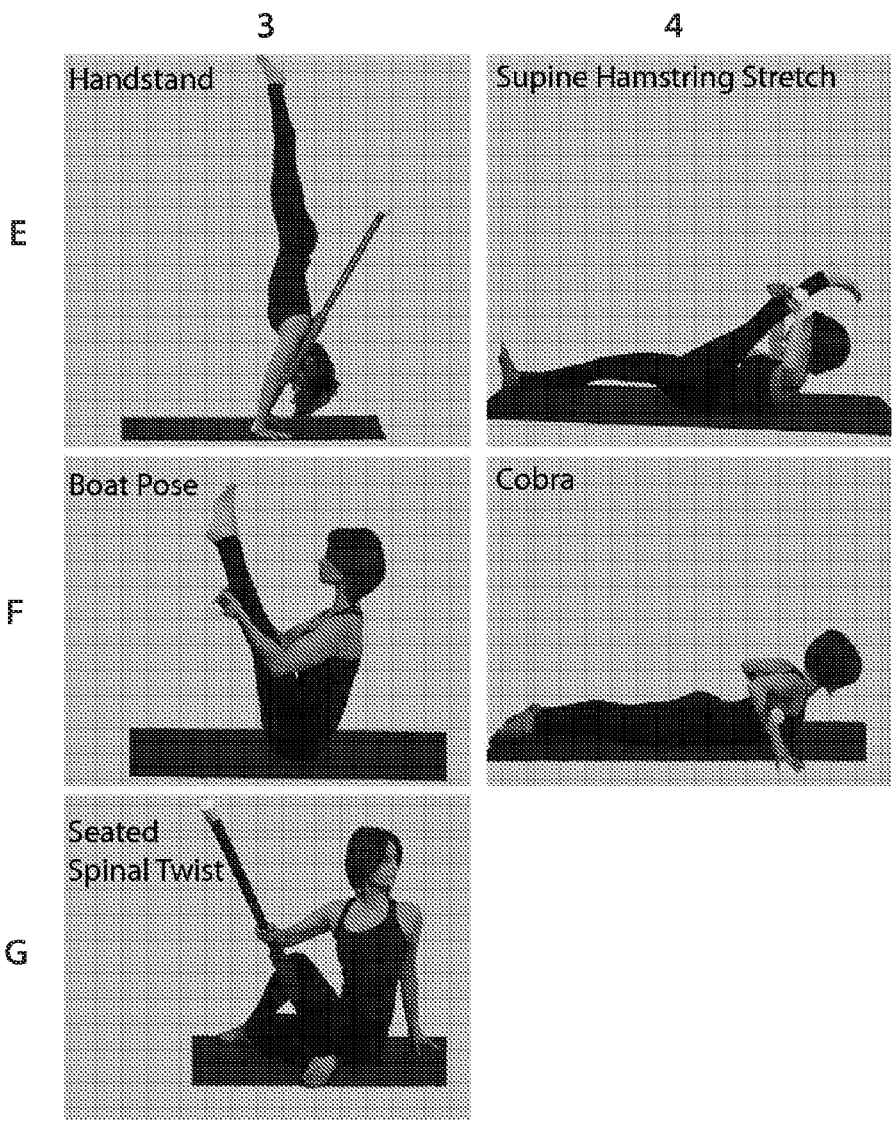

Another treatment that can be performed with the user facing away from the health aid 10 is shown in cell G2 of FIG. 15B. The user starts with the health aid 10 resting against a vertical surface (V) with the elongated members 20, 40 separated from one another in an open position or an engaged position. The user then lays with their head between the elongated members 20, 40 and the rest of the body extending away from the health aid 10 with the knees bent and the feet resting on the ground. The user then engages each hand with the elongated member 20, 40 on the same side of the body, and pushes up into a full wheel position as shown in cell G2 of FIG. 15B. This treatment increases strength and flexibility, which can treat and prevent neck, shoulder, and back pain.

The treatment can also include holding any of the positions described herein, releasing the positions herein, optionally, switching between the positions herein, and repeating (i.e. holding and releasing again) the positions herein. For example, a user can repeat once or twice in the same session. A user can also reapply the treatment multiple times or at regular intervals in order to prevent and/or treat neck, shoulder, and back pain by applying pressure, enhancing flexibility, or building strength. The treatment can also include switching between the fully assembled health aid 10 configuration and the single stick 26 configuration and executing at least one treatment (e.g., position) using each configuration 10, 26. In some embodiments, the treatment can be reapplied multiple times during the day and/or multiple days during the week.

Figures 16, 17:
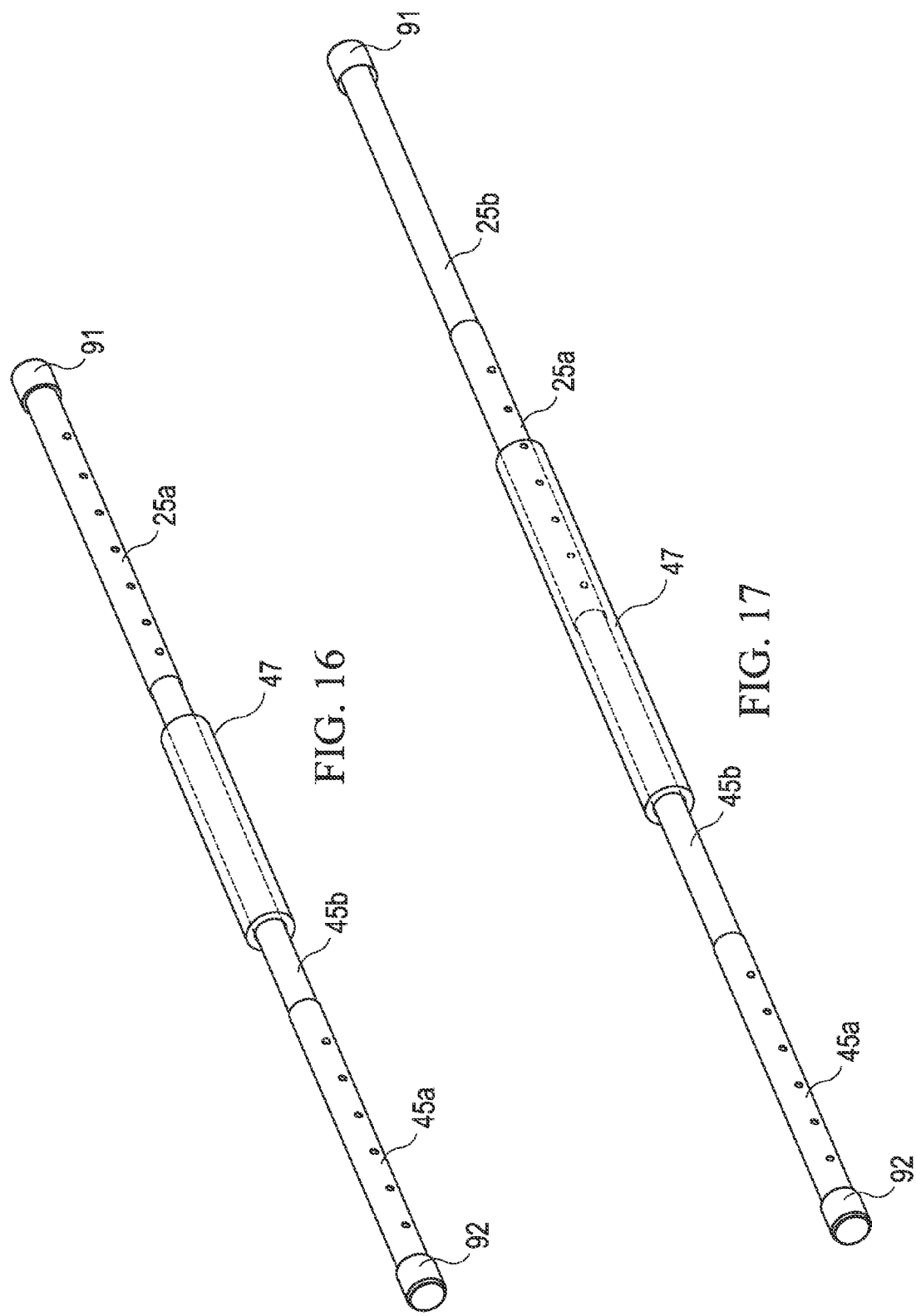
FIG. 16 is a perspective view of a three segment single stick formed from elements of the health aid as described herein.
FIG. 17 is an perspective view of a four segment single stick formed from elements of the health aid as described herein.

Some treatments utilize a single stick 26 configuration. The single stick 26 can be obtained by removing portions from each of the elongated members 20, 40. For example, in one embodiment, the two lower segments 25A, 25B of the first elongated member 20 and the lowest segment 45A of the second elongated member 40 can be removed from the health aid 10 and combined so that one lower segment 25A, 45A is extending from each end of the middle segment 25B of the first elongated member 20. In some embodiments, one of the cushioning pieces 27, 47 can slide over the single stick 26 (e.g., over the middle segment 25B) and be positioned to facilitate the user's comfort while assuming the positions that are part of the treatment. In some embodiments, as shown in FIG. 16, the single stick 26 will include a securing foot 91, 92 at each end.

In some embodiments, a longer single stick 26 is desired. This can be achieved by removing the two lower segments 25A, 25B from the first elongated member 20 and the two lower segments 45A, 45B from the second elongated member 40. As shown in FIG. 17, the securing foot 91, 92 can be removed from one of the lowest segments 25A, 45A and that lowest segment 25A, 45A can be coupled to the other middle segment 45B, 25B. The securing foot 91, 92 that was removed can then be placed over uncovered end of the single stick 26 (e.g., the exposed end of the middle segment 25B, 45B). In some embodiments, one or both of the cushioning pieces 27, 47 can slide over the single stick 26 and be positioned to facilitate the user's comfort while assuming the positions that are part of the treatment.

As will be understood, the health aid 10 can be reassembled to the original fully assembled configuration by reversing the process used to form the single stick 26.

In such treatments, the user engages a single stick 26 with the hands or arms and then moves into a position. The hands or arms can engage the single stick 26 on opposite halves along the length of the single stick 26 (i.e., one hand/arm engages a bottom half 21 of the single stick 26, while the other hand/arm engages the top half 22). In this instance, the single stick 26 can assist with posture and form while the user executes an exercise, and can add weight for building strength. Examples of such treatments, include, but are not limited to, back arm stretch, side stretch, chest opener, shoulder and upper arm opener, reversed warrior, triangle pose, wide angle forward bend, wide angle forward bend with arms overhead, supine hamstring stretch, seated forward bend, seated forward bend modified, boat pose, cobra, and locust, which correspond to the poses shown in cells B4, C1-C3, D1-D4, E4, F1-F4, G1 and G3 of FIGS. 15A-15D, respectively.

In some embodiments, the instructions include anchoring a first end of the single stick 26 against the ground and/or a leg of the user (e.g., a lower leg), and gripping an intermediate portion of the single stick 26 with one hand or arm simultaneous while assuming a position (e.g., treatment). Examples of such treatments (positions), include, but are not limited to, warrior III and seated spinal twist, which correspond to cells C4 and G3, respectively.

One advantage of the health aid, health aid kit, and method is that the treatment can be administered at home or at other convenient locations such as at work, without further medical assistance, with an easy-to-use and economical device. The treatment can also allow a user to self-administer pain relief.

Figure 14:
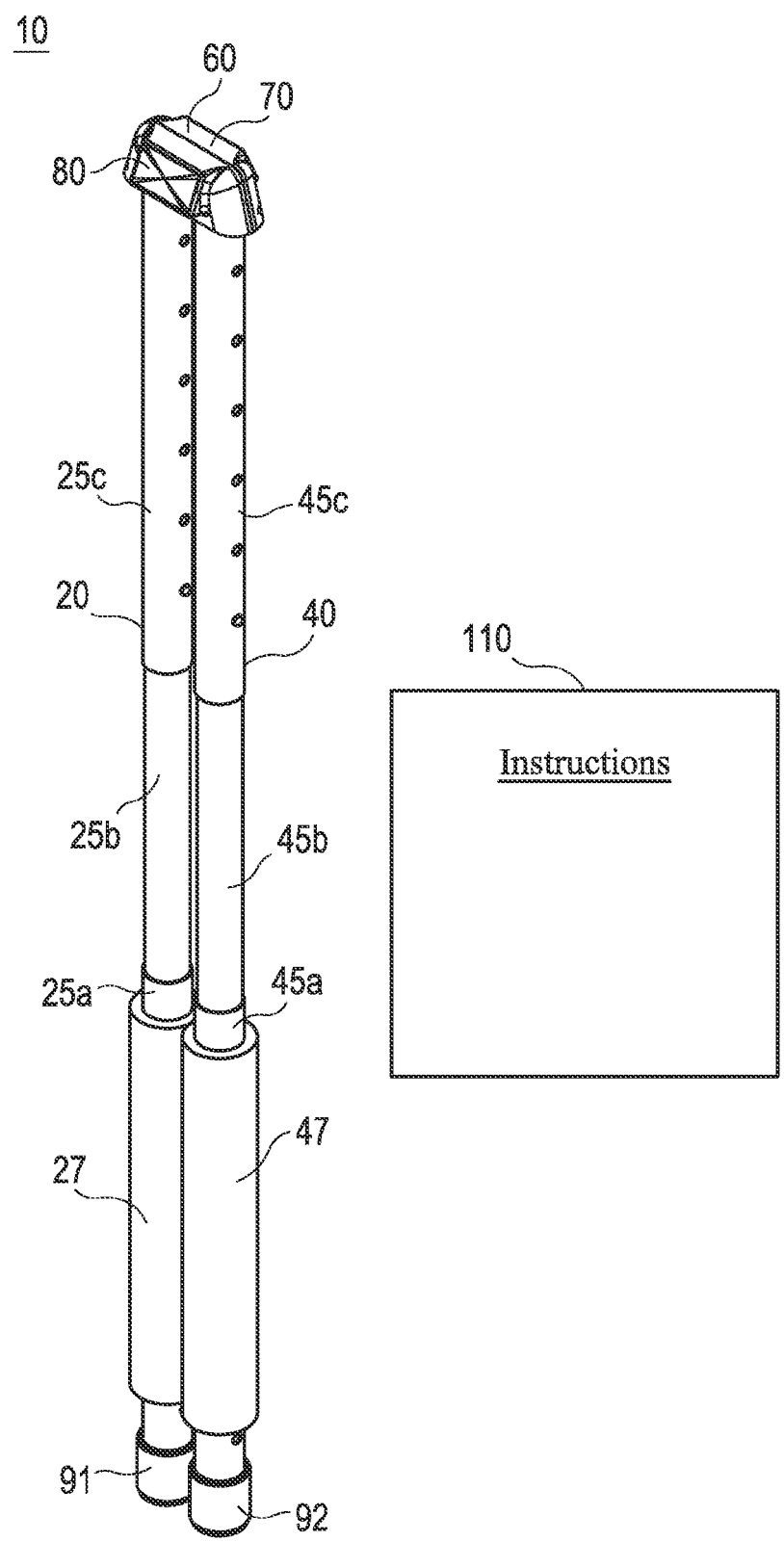
FIG. 14 is a perspective view of a kit including an assembled health aid and instructions.

As shown in FIG. 14, a health aid kit 100 is also provided. The health aid kit 100 includes a health aid 10 as described herein, as well as, instructions 110 for carrying out a method of pain relief, stretching, and/or strength building consistent with any of the variants described herein. In some embodiments, the kit 100 can include the health aid 10 in an assembled state, as shown in FIG. 1, while the health aid 10 provided in the kit 100 may be partially or fully disassembled, as shown in FIGS. 6, 7, and 9, in other embodiments. Depending on the embodiment, the instructions 110 can be printed on one or more sheets (e.g., paper, polymer, poster) or provided as text, images, video, and/or audio and video on a DVD, a web site or downloaded to a reader, smart phone, or other digital device.

In some embodiments, the instructions 110 are directed toward prevention and/or treatment of neck, shoulder, and back pain (e.g., applying pressure, stretching, or strength building), and in some embodiments the device can be used to stretch and strengthen other parts of the body. As will be understood, unless otherwise specified back pain refers to all types of back pain, including upper and lower back pain. The instructions can include some or all of the steps of the methods described herein. In some embodiments, the instructions 110 can be one or more pictures, such as those shown in FIGS. 15A-15D, which depict the postures, positions, and exercises used for the treatment.

The instructions can be in the form of at least one written instruction, at least one verbal instruction, at least one graphical depiction, or a combination thereof, that communicates the position of the user and the health aid during the treatment. Examples of instructions in the form of graphical depictions include each of the cells shown in FIG. 15A-15D. When presented using a digital device (e.g., smart phone or tablet), the graphical depiction can be in the form of a video (e.g., streamed, downloaded, DVD, etc.), which may or may not include a narrative regarding how to perform the treatments (e.g., exercises or poses) and/or how to switch between the assembled health aid 10 and the single stick 26 configurations.

The health aid, health aid kit, and method provide a pain relief treatment that targets, alleviates, and/or prevents chronic tension in the neck and shoulder region and also in the lower back. In some embodiments, such as those shown in cells A1-A4 and E1-E3 of FIGS. 15A and 15C, the treatment can provide direct and steady pressure to the neck and/or shoulder muscles, and specifically the treatment lifts the neck and/or shoulder muscles up toward the hips while simultaneously allowing a steady downward traction of the neck. The treatment can also open the thoracic inlet for further health benefits including positive changes in posture, such as through reconstituting the lumbar curve of the spine. Furthermore, because the back is one holistic unit, when muscular tension in the upper back is reduced a "re-organization" occurs throughout the whole structure and lower back tension is diminished as well. In addition to neck, shoulder and back pain relief, other advantages can include reduction in the frequency and/or intensity of tension headaches, reduction of temporomandibular joint (TMJ) pain for TMJ issues that originate in the neck, restoration of the lumbar curve and improved posture.

The treatment can also be used for budding strength and flexibility of the user, which also have the effect of targeting, alleviating, and/or preventing chronic tension in the neck and shoulder region, as well as, the back, and other parts of the body, depending on the exercise performed.

In some embodiments, the health aid kit 100 includes a health aid 10 as described herein and instructions 110 for using the health aid 10 as part of a treatment. In some embodiments, the treatment is designed for achieving one or more results selected from the group consisting of pain prevention, pain relief, increased flexibility, and increased strength. The instructions can include any or all of the steps for using the health aid 10 or single stick 26 that are described herein In some embodiments, the instructions include engaging each of the first and second elongated members with either a hand or a neck and/or shoulder muscle of the user, while the health aid is arranged at an angle against a substantially vertical plane, and wherein the first and second members are in an open or engaged position at the time of the engaging. In particular, the right hand or neck/shoulder muscle engages the elongated member immediately in front of or behind the right hand or neck/shoulder muscle, while the left hand or neck/shoulder muscle engages the elongated member immediately in front of or behind the left hand.

In some embodiments, the instructions comprise engaging each of said first and second elongated members with a hand of the user, while the health aid is arranged at an angle against a substantially vertical plane, and wherein the first and second members are in an open or engaged position at the time of the engaging. In some embodiments, the instructions comprise engaging each of said first and second elongated members with a neck and/or shoulder muscle of the user, while the health aid is arranged at an angle against a substantially vertical plane, and wherein the first and second members are in an engaged position at the time of the engaging.

In some embodiments, the instructions include arranging said health aid at an angle against a substantially vertical surface; and, once arranged, moving said health aid to said engaged position, and engaging said first and second elongated members of said health aid against a user's neck and/or shoulder muscle.

In some embodiments, the instructions related to said moving step also include arranging the health aid in the open position; inserting a user's head and neck between the first and second elongated members; and moving the first and second elongated members closer together wherein said first and second elongated members abut a user's neck and/or shoulder muscles.

In some embodiments, the instructions related to said engaging step also include stretching the neck and/or shoulder muscles in a first direction and concurrently stretching the neck and/or shoulder muscles in a second direction, wherein the second direction is substantially opposite the first direction.

In some embodiments, the instructions related to said engaging step also include engaging the first elongated member against a user's right neck and/or shoulder muscles and engaging the second elongated member against a user's left neck and/or shoulder muscles wherein a user suspends his head in an inverted position.

In some embodiments, the instructions related to the arranging step also include arranging a top end of said health aid to engage with a substantially vertical surface, while arranging a bottom end of each of the first and second elongated members to engage with a substantially horizontal surface.

In some embodiments, the instructions for using the health aid as part of a treatment include engaging the bottom half of a single stick (i.e., elongated member 20, 40) of the health aid with a first hand or arm of a user and a top half of the single stick of the health aid with a second hand or arm of the user while assuming a position intended to increase flexibility, strength, or both, wherein only a single stick is used at the time of the assuming. Examples of such embodiments include, but are not limited to, cells B4, C1-C3, D1-D4, E4, F1-F4, G1 and G3 of FIG. 15A-15D.

In some embodiments, the instructions include removing an elongated member 20, 40 from the health aid 10 in order to obtain a single stick 26. In some embodiments, the instructions include reattaching the part of the single stick 26 in order to reassemble the health aid 10.

In some embodiments, the instructions can be two parts. For example, the instructions can include one or more descriptions (e.g., written, video, audio, images, etc.) of postures or poses, such as those in FIG. 15A-15D on one sheet, and instructions for removing or reattaching an elongated member 20, 40 to form a single stick in another place (i.e., a different part of the video, different page or sheet of instructions, etc.). The instructions for the positions and switching between health aid and single stick configurations can be in different places or on different portions of the instructions (e.g., different sheets or pages, different videos, different parts of a video, different media). For examples, the instructions can include a poser with the postures, such as that shown in FIGS. 15A-15D, while the instructions for switching between the assembled health aid 10 and the single stick 26 can be in a separate assembly guide.

In some embodiments, the bottom half of the single stick is engaged with a first hand or arm of a user and a top half of the single stick is engaged with a second hand or arm of the user. Examples of such embodiments include, but are not limited to, cells C2, D1, D2, and F4 of FIGS. 15A and 15D.

In some embodiments, the instructions include assuming a number of different positions, each intended to increase flexibility, strength, or both. These instructions can include switching back and forth between the standard health aid configuration 10 and the single stick 26 configuration.

For example, in some embodiments, the instructions include assuming a second position intended to increase flexibility, strength, or both. The instructions for assuming the second position can include engaging each of the first and second elongated members with either a hand or a neck and/or shoulder muscle of the user in order to assume a second position intended to increase flexibility, strength, or both, wherein the first and second members are in an open or engaged position at the time of assuming the second position.

In some embodiments, the instructions can provide for initial positions that are assumed using the fully assembled health aid 10, while one or more subsequent positions can be assumed using the single stick configuration. For examples, In some embodiments, the instructions comprise assuming a second position intended to increase flexibility, strength, or both, where the instructions for assuming the second position include (1) removing at least a portion of one of the elongated members from the health aid to obtain a single stick, and (2) engaging the single stick with a first hand or arm of a user while assuming said second position intended to increase flexibility, strength, or both.

In some embodiments, the instructions can include reassembling the health aid to an original configuration; and assuming a third position intended to increase, flexibility, strength, or both. In such instances, the instructions for assuming the third position can include engaging each of the first and second elongated members with either a hand or a neck and/or shoulder muscle of the user in order to assume a third position intended to increase flexibility, strength, or both, and wherein the first and second members are in an open or engaged position at the time of assuming in the third position.

EXAMPLES

In one instance, a patient experienced chronic tension in his neck and shoulders. Common stretches for this region proved ineffective. The patient used the health aid and method of engaging the neck and shoulder muscles as described herein on a daily basis to target the exact region where tension presented. This treatment resulted in a significant reduction in the tension to the patient's neck and shoulder region and treatment over time kept most of the tension from returning. The patient described the result as feeling "lighter" in his neck.

In another instance, another patient experienced chronic pain in her neck, shoulders and lower back. The patient used the health aid and method of engaging the neck and shoulder muscles as described herein on a daily basis to her target neck and shoulder tension. The treatment resulted in the improvement, not only in the neck and shoulders, but also in her lower back.

In another instance, another patient experienced upper back tension due to poor posture. The patient used the health aid and method of engaging the neck and shoulder muscles as described herein on a weekly basis to target her upper back. Over time, the treatment resulted in significant improvement of the patient's posture and a reduction in the pain felt by patient in her upper back.

In another instance, another patient experienced neck pain and, when the tension in the neck was severe, TMJ or jaw pain also. The patient used the health aid and method of engaging the neck and shoulder muscles as described herein on a weekly basis to target the neck/shoulder region. The treatment resulted in a marked improvement in er neck and the TMJ pain diminished significantly.

In another instance, another patient had life-long neck issues from many falls during activities such as skiing, water skiing, etc. The patient used the health aid and method of engaging the neck and shoulder muscles as described herein on a weekly basis to target his neck/shoulder region. The treatment resulted in significant pain reduction felt by the patient, who enjoys the feeling of traction the health aid apparatus provides.

In another instance, another patient experienced neck and shoulder tension with frequent headaches. The patient used the health aid and method of engaging the neck and shoulder muscles as described herein on a daily basis to target the neck and shoulder region. The treatment resulted in a reduction of tension in the patient's neck and shoulders, and has directly helped to reduce the frequency of her headaches.

The foregoing is provided for purposes of illustrating, explaining, and describing embodiments of this invention. Modifications and adaptations to these embodiments will be apparent to those skilled in the art and may be made without departing from the scope or spirit of this invention.

The invention claimed is:

1. A health aid kit comprising:
    a health aid comprising:
        a first elongated member,
        a second elongated member, and
        an attachment connecting said first and second elongated members and configured for the first and second elongated members to move between a closed position wherein a bottom end of each of said first and second elongated members are adjacent, and an open position wherein said bottom ends are separated by a first distance, wherein the first and second elongated members can also move to an engaged position wherein said bottom ends are separated by a second distance that is less than said first distance,
        wherein said attachment comprises a cap having an angled resting face for engagement with a substantially vertical surface when the first and second elongated members are in the engaged position; and
    instructions for using said health aid as part of a treatment, said instructions comprising:
        engaging each of said first and second elongated members with either a hand or a neck and/or shoulder muscle of a user while the health aid is arranged at an angle against a substantially horizontal plane in order to assume a first position intended to increase flexibility, strength, or both, and wherein the first and second members are in the open or engaged position when the user engages each of said first and second elongated members and assumes the first position.

2. The kit according to claim 1, wherein the instructions comprise engaging each of said first and second elongated members with the hand of the user, while the health aid is arranged at the angle against the substantially horizontal plane, and wherein the first and second members are in the open or engaged position when the user engages each of said first and second elongated members.

3. The kit according to claim 1, wherein the instructions comprise engaging each of said first and second elongated members with the neck and/or shoulder muscle of the user, while the health aid is arranged at the angle against the substantially horizontal plane, and wherein the first and second members are in the engaged position when the user engages each of said first and second elongated members.

4. The kit according to claim 1, wherein the instructions comprise at least one graphical depiction of the user and the health aid during the treatment.

5. The kit according to claim 1, wherein the instructions comprise at least one set of written instructions describing the first position of the user and the health aid during the treatment.

6. The kit according to claim 1, wherein the treatment is designed for achieving one or more results selected from the group consisting of pain prevention, pain relief, increased flexibility, and increased strength.

7. The kit according to claim 1, wherein said instructions comprise:
    arranging said health aid at an angle against a substantially horizontal surface; and, once arranged,
    moving said health aid to said engaged position, and
    engaging said first and second elongated members of said health aid against the user's neck and/or shoulder muscle.

8. The kit according to claim 7, wherein the instructions related to said moving step further comprise:
    arranging said health aid in said open position;
    inserting the user's head and neck between said first and second elongated members; and
    moving said first and second elongated members closer together wherein said first and second elongated members abut the user's neck and/or shoulder muscles.

9. The kit according to claim 8, wherein said instructions related to said step of engaging said first and second elongated members of said health aid against the user's neck and/or shoulder muscle further comprise:
    stretching the user's neck and/or shoulder muscles in a first direction and concurrently stretching the user's neck and/or shoulder muscles in a second direction, wherein the second direction is substantially opposite the first direction.

10. The kit according to claim 8, wherein said instructions related to said step of engaging said first and second elongated members of said health aid against the user's neck and/or shoulder muscle further comprise:

engaging said first elongated member against the user's shoulder muscles and/or right side of the neck and engaging said second elongated member against the user's shoulder muscles and/or left side of the neck wherein the user suspends his or her head in an inverted position.

11. The kit according to claim 8, wherein said instructions related to said step of arranging said health aid at the angle against the substantially horizontal surface further comprise:
arranging a top end of said health aid to engage with the substantially vertical surface, while arranging the bottom end of each of said first and second elongated members to engage with the substantially horizontal surface.

12. The kit according to claim 1, wherein said cap comprises:
a first elongated member receiving portion connected proximate to a top end of the first elongated member; and
a second elongated member receiving portion connected proximate to a top end of the second elongated member,
wherein the instructions related to said arranging step comprise engaging said resting face with said substantially vertical surface.

13. The kit according to claim 1, wherein said instructions comprise positioning an upper portion of said first and second elongated members against the substantially vertical surface and positioning the bottom end of each of said first and second elongated members against a substantially horizontal surface.

14. The kit according to claim 1, wherein said attachment connects said first and second elongated members proximate to a top end of each of said first and second elongated members.

15. The kit according to claim 1, wherein the instructions further comprise assuming a second position intended to increase flexibility, strength, or both, wherein the instructions for assuming said second position comprise:
engaging each of said first and second elongated members with either the hand or the neck and/or shoulder muscle of the user in order to assume the second position intended to increase flexibility, strength, or both, and wherein the first and second members are in the open or engaged position when the user assumes the second position.

16. The kit according to claim 1, wherein the instructions further comprise assuming a second position intended to increase flexibility, strength, or both, wherein the instructions for assuming said second position comprise:
instructions for removing at least a portion of one of the elongated members from the health aid to obtain a single stick, and
instructions for engaging the single stick with a first hand or arm of the user while assuming said second position intended to increase flexibility, strength, or both.

17. The kit according to claim 16, wherein the instructions further comprise:
reassembling the health aid to an original configuration; and
assuming a third position intended to increase, flexibility, strength, or both, wherein the instructions for assuming the third position comprise engaging each of said first and second elongated members with either the hand or the neck and/or shoulder muscle of the user in order to assume the third position intended to increase flexibility, strength, or both, and wherein the first and second members are in the open or engaged position when the user assumes the third position.

18. A health aid kit comprising:
a health aid comprising:
a first elongated member with a top end and a bottom end;
a second elongated member with a top end and a bottom end; and
a cap comprising a first elongated member receiving portion connected proximate to said top end of the first elongated member, a second elongated member receiving portion connected proximate to said top end of the second elongated member, and
an outer resting face for engagement with a substantially vertical surface,
wherein said cap is configured for the first and second elongated members to move between a closed position wherein the bottom end of each of said first and second elongated members are adjacent, and an open position wherein said bottom ends are separated by a first distance, wherein the first and second elongated members can also move to an engaged position wherein said bottom ends are separated by a second distance that is less than said first distance; and
instructions for removing at least a portion of one of the elongated members from the health aid to obtain a single stick,
instructions for using said single stick as part of a treatment, said instructions comprising:
engaging the single stick with a first hand or arm of a user while assuming a position intended to increase flexibility, strength, or both.

19. The kit according to claim 18, wherein the instructions comprise at least one graphical depiction of the user and the single stick during the treatment, at least one set of written instructions describing the position of the user and the single stick during the treatment, at least one set of verbal instructions describing the position of the user and the single stick during the treatment, or a combination thereof.

20. The kit according to claim 18, wherein the engaging step in the instructions comprises engaging a bottom half of the single stick with the first hand or arm of the user and a top half of the single stick with a second hand or arm of the user while assuming the position intended to increase flexibility, strength, or both.

\* \* \* \* \*